United States Patent
Kwak et al.

(10) Patent No.: US 7,209,749 B2
(45) Date of Patent: Apr. 24, 2007

(54) METHOD FOR DETERMINING DATA RATE OF USER EQUIPMENT SUPPORTING EUDCH SERVICE

(75) Inventors: Yong-Jun Kwak, Yongin-si (KR); Sung-Ho Choi, Suwon-si (KR); Ju-Ho Lee, Suwon-si (KR); Youn-Hyoung Heo, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 145 days.

(21) Appl. No.: 10/751,629

(22) Filed: Jan. 5, 2004

(65) Prior Publication Data

US 2004/0198369 A1     Oct. 7, 2004

(30) Foreign Application Priority Data

Jan. 4, 2003    (KR) ..................... 10-2003-0000466
Dec. 18, 2003   (KR) ..................... 10-2003-0093243

(51) Int. Cl.
*H04Q 7/20*     (2006.01)
(52) U.S. Cl. ................. 455/452.2; 455/446; 455/442; 455/435.3; 455/436; 455/407; 455/456.2; 370/329
(58) Field of Classification Search ............... 455/13.4, 455/427.1, 127.5, 522, 574, 446, 442, 435.3, 455/436, 407, 456.2; 370/318; 320/329
See application file for complete search history.

(56) References Cited

U.S. PATENT DOCUMENTS

| 5,621,723 | A | 4/1997 | Walton, Jr. et al. |
| 5,991,618 | A | 11/1999 | Hall |
| 6,600,903 | B1* | 7/2003 | Lilja et al. ............... 455/67.11 |
| 6,859,446 | B1* | 2/2005 | Gopalakrishnan et al. .. 370/335 |
| 2002/0168994 | A1* | 11/2002 | Terry et al. ................. 455/522 |
| 2002/0191556 | A1* | 12/2002 | Krishnarajah et al. ...... 370/329 |
| 2005/0096063 | A1* | 5/2005 | Muniere ................... 455/452.2 |

FOREIGN PATENT DOCUMENTS

| EP | 1 011 208 | 6/2000 |
| EP | 1 187 370 | 3/2002 |
| JP | 06-276176 | 9/1994 |
| WO | WO 99/09779 | 2/1999 |
| WO | WO 01/24568 | 4/2001 |
| WO | WO 01/47146 | 6/2001 |

\* cited by examiner

*Primary Examiner*—Joseph Feild
*Assistant Examiner*—David Q. Nguyen
(74) *Attorney, Agent, or Firm*—The Farrell Law Firm

(57) ABSTRACT

Disclosed is a method for determining a data rate of a user equipment (UE) for an enhanced uplink dedicated channel (EUDCH) service by a Node B in a mobile communication system having a radio network controller (RNC), the UE transmitting UE transmission power class information to the RNC, and the Node B having a table for storing total transmission power corresponding to the transmission power class, the Node B supporting the EUDCH service of the UE. The method comprises receiving uplink channel condition information of the UE from the UE, and receiving UE transmission power class information from the RNC; and reading total transmission power corresponding to the received UE transmission power class from the table, and determining a data rate of the UE considering the uplink channel condition information and the total transmission power.

5 Claims, 18 Drawing Sheets

METHOD FOR DETERMINING DATA RATE OF USER EQUIPMENT SUPPORTING EUDCH SERVICE

PRIORITY

This application claims priority under 35 U.S.C. § 119 to an application entitled "Method for Determining Data Rate of User Equipment Supporting EUDCH Service" filed in the Korean Intellectual Property Office on Jan. 4, 2003 and assigned Serial No. 2003-466, and an application entitled "Method for Determining Data Rate of User Equipment Supporting EUDCH Service" filed in the Korean Intellectual Property Office on Dec. 18, 2003 and assigned Ser. No. 2003-93243, the contents of both of which are incorporated herein by reference.

BACKGROUND OF THE INVENTION

1. Field of the Invention

The present invention relates generally to a mobile communication system supporting an enhanced uplink dedicated channel (hereinafter referred to as "EUDCH") service, and in particular, to a method for determining a data rate for an EUDCH service of a user equipment (UE) by a Node B in performing control scheduling on the UE.

2. Description of the Related Art

The present invention is provided on the assumption that an enhanced uplink dedicated channel (EUDCH) is used in a wideband code division multiple access (WCDMA) communication system. The EUDCH is a channel proposed to improve packet transmission capability for uplink transmission in an asynchronous code division multiple access (CDMA) communication system. For the EUDCH technology, new short transmission time interval (TTI) technology can be used together with AMC (Adaptive Modulation and Coding) and HARQ (Hybrid Automatic Retransmission Request) used in existing HSDPA (High Speed Downlink Packet Access). The TTI can be defined as a transmission unit for which one data block is transmitted over a physical channel. In HSDPA, as scheduling of a downlink channel is performed not by a radio network controller (RNC) but by a Node B, scheduling of an uplink channel is also performed by the Node B. Of course, Node B's uplink control scheduling is greatly different from Node B's downlink control scheduling.

FIG. 1 is a fundamental conceptual diagram illustrating a situation where EUDCH is used. In FIG. 1, reference numeral 100 represents a Node B supporting EUDCH, and reference numerals 101 to 104 represent user equipments (UEs) transmitting EUDCH. The Node B 100 analyzes channel conditions of UEs that use the EUDCH, and performs proper scheduling on each UE. The scheduling is performed in such a manner that a low data rate is assigned to a UE located far from the Node B and a high data rate is assigned to a UE located close to the Node B as long as a measured noise rise value of the Node B does not exceed a target noise rise value, in order to increase the entire system capability.

A fundamental EUDCH transmission/reception procedure will be described with reference to FIG. 2. FIG. 2 illustrates a transmission/reception procedure between a UE 202 transmitting EUDCH and a Node B 201 to which the UE 202 belongs. The Node B 201 and the UE 202 perform EUDCH transmission/reception setup in step 203. The setup process includes a process of delivering messages over a dedicated transport channel. After EUDCH setup is performed in step 203, the UE 202 sends scheduling information to the Node B 201 in step 204. The scheduling information sent in step 204 can include the UE's transmission power information from which uplink channel information can be detected, the UE's transmission power margin information, or an amount of transmission data stored in a buffer of the UE. The Node B 201, receiving the scheduling information from a plurality of UEs, schedules the respective UEs while monitoring the scheduling information from the UEs in step 211. A scheduling method can be dependent upon the Node B 201, and a detailed description of the scheduling method will now be described.

When the Node B 201 schedules the UE 202 according to the process of step 211, the Node B 201 transmits scheduling assignment information to the UE 202 in step 205. The UE 20 then transmits EUDCH using an assigned data rate and transmission timing included in the scheduling assignment information of step 205 in step 207. A transport format resource indicator (hereinafter referred to as "TFRI"), which is resource information of EUDCH of step 207, is transmitted to the Node B 201 together with EUDCH of step 207, in step 206. After receiving the channels of steps 206 and 207, the Node B 201 determines whether there is an error in the TFRI of step 206 and the EUDCH of step 207. If there is any error in either the TFRI of step 206 or the EUDCH of step 207, the Node B 201 transmits NACK information to the UE 202 over an ACK/NACK channel in step 208. However, if there is no error in both the TFRI of step 206 and the EUDCH of step 207, the Node B 201 transmits ACK information to the UE 202 over the ACK/NACK channel in step 208.

Meanwhile, the Node B 201 determines a data rate to be designated to the UE based on the scheduling information received in step 204. In this process, the Node B must assign a proper data rate and transmission timing to several UEs using EUDCH, and resources must be assigned to the UEs so that an uplink noise rise value should not exceed a target noise rise value in the scheduling. Of course, for improvement of the entire system capability, more resources are assigned to a UE having a better channel condition.

Herein, a description will be made of a procedure for scheduling a UE by a Node B in transmitting and receiving EUDCH. As described above, the Node B schedules EUDCH transmission of several UEs so that a noise rise value should not exceed a target noise rise value, and at the same time, the Node B's capacity should be maximized. The Node B performs such scheduling using the scheduling information received from respective UEs in step 204. The scheduling information of step 204 can be used in the following two methods.

In a first method, each UE notifies a Node B of its transmission power value. Also, the UE can inform the Node B of an amount (quantity size) of data stored in its buffer. In this method, the Node B can estimate an uplink channel condition in a situation that each UE faces, using transmission power of the UE, so it can assign proper resources to each UE.

A detailed description of the method will now be made with reference to FIG. 1. In FIG. 1, the UEs 101 to 104 are different from each other in distance from the Node B 100, and the UE 101 is located closest to the Node B 101 while the UE 104 is located farthest from the Node B 101. In this case, the UE 101 has the lowest uplink channel power strength (represented by a thinnest arrow 111), and the UE 104 has the highest uplink channel power strength (represented by a thickest arrow 114). Therefore, as a method for obtaining the highest capability while maintaining the same measured noise rise value, scheduling is performed in such a manner that power strength should be in reverse proportion to a data rate. That is, scheduling is performed in such a manner that a UE located close to a Node B, like the UE 101, having low uplink transmission power is assigned the highest data rate, while a UE located far from the Node B, like the UE 104, having high uplink transmission power is assigned the lowest data rate. Such a method is called "maximum CQI (Channel Quality Indicator) scheduling." However, in this method, the Node B has no information on a transmission power margin available for each UE, increasing possibility that flexibility of scheduling will be lost.

That is, even though more resources are assigned to a UE having a good uplink channel environment, if a transmission power margin of the UE is not sufficient, the UE cannot sufficiently use the assigned resources. For example, since the UE is located close to the Node B 100, like the UE 101, it can transmit data at low uplink transmission power. In addition, although the UE can be assigned a relatively high data rate in transmitting data, if a transmission power margin of the UE is not sufficient, the UE, in some cases, cannot use maximum resources determined by the Node B 100. That is, as described above, since the Node B 100 does not have information on an available power margin of the UE 101, the Node B 100 cannot effectively determine how many resources it should assign to the UE 101.

In a second method, a transmission power margin of a UE is determined with the scheduling information. A UE informs a Node B of its available power margin, and the Node B receiving the transmission power margins from several UEs assigns resources to the UEs through scheduling so as to efficiently increase cell capability.

However, in this method, the Node B cannot accurately detect a channel condition of each UE. That is, transmission power margin information that the UE sends to the Node B does not have uplink channel condition information of the UE. Therefore, the maximum CQI scheduling method that performs scheduling according to a channel condition cannot be used.

For example, according to this method, when a transmission power margin is transmitted from the UEs 101 to 104 to the Node B 100, relatively many resources are assigned to a UE having a large power margin while relatively fewer resources are assigned to a UE having a small power margin. In this case, even the UE having a large power margin, when its channel environment is poor, cannot be sufficiently assigned as many resources as the value for which the power margin is considered. That is, even though sufficient resources as determined by the power margin are assigned, normal data transmission/reception becomes difficult due to the poor channel environment, causing a reduction in channel capacity.

As described above, a Node B assigns resources to UEs that use EUDCH, through scheduling. The scheduling is performed using scheduling information delivered by a UE over an uplink. The above-stated two proposed conventional methods lack information for optimized scheduling. Accordingly, there is a demand for a method for maximizing system capability by efficiently performing scheduling in which the Node B assigns resources to UEs that use EUDCH.

SUMMARY OF THE INVENTION

It is, therefore, an object of the present invention to provide a method for signaling scheduling information required in performing control scheduling on UEs supporting an enhanced uplink dedicated channel (EUDCH), to a Node B by a UE and a radio network controller.

To achieve the above and other objects, there is provided a method for determining a data rate of a user equipment (UE) for an enhanced uplink dedicated channel (EUDCH) service by a Node B in a mobile communication system having a radio network controller (RNC), the UE transmitting UE transmission power class information to the RNC, and the Node B having a table for storing total transmission power corresponding to the transmission power class, the Node B supporting the EUDCH service of the UE. The method comprises the steps of receiving at the Node B uplink channel condition information of the UE from the UE, and receiving at the Node B UE transmission power class information from the RNC; and reading total transmission power corresponding to the received UE transmission power class from the table, and determining a data rate of the UE considering the uplink channel condition information and the total transmission power.

Preferably, the uplink channel condition information of the UE is transmission power information of the UE.

Further, the method comprises the step of calculating transmission power margin information of the UE using the total transmission power and the transmission power information, and determining a data rate of the UE considering the transmission power information and the transmission power margin information.

To achieve the above and other objects, there is provided a method for determining a data rate of a user equipment (UE) for an enhanced uplink dedicated channel (EUDCH) service by a Node B in a mobile communication system having a radio network controller (RNC), the UE transmitting UE transmission power class information to the RNC, and the Node B having a table for storing total transmission power corresponding to the transmission power class, the Node B supporting the EUDCH service of the UE. The method comprises the steps of receiving at the Node B transmission power margin information of the UE from the UE, and receiving at the Node B UE transmission power class information from the RNC; and reading total transmission power corresponding to the received UE transmission power class from the table, and determining a data rate of the UE considering the transmission power margin information and the total transmission power.

To achieve the above and other objects, there is provided a method for determining a data rate of a user equipment (UE) for an enhanced uplink dedicated channel (EUDCH) service by a Node B in a mobile communication system having the UE and the Node B having a table for storing total transmission power corresponding to a transmission power class of the UE, the Node B supporting the EUDCH service of the UE. The method comprises the steps of receiving at the Node B uplink channel condition information of the UE and UE transmission power class information from the UE; and reading total transmission power corresponding to the received UE transmission power class from the table, and determining a data rate of the UE considering the uplink channel condition information and the total transmission power.

Preferably, the uplink channel condition information of the UE is transmission power information of the UE.

Further, the method comprises the step of calculating transmission power margin information of the UE using the total transmission power and the transmission power information, and determining a data rate of the UE considering the transmission power information and the transmission power margin information.

To achieve the above and other objects, there is provided a method for determining a data rate of a user equipment (UE) for an enhanced uplink dedicated channel (EUDCH) service by a Node B in a mobile communication system having the UE and the Node B having a table for storing total transmission power corresponding to a transmission power class of the UE, the Node B supporting the EUDCH service of the UE. The method comprises the steps of receiving at the Node B transmission power margin information of the UE and UE transmission power class information from the UE; and reading total transmission power corresponding to the received UE transmission power class from the table, and determining a data rate of the UE considering the transmission power margin information and the total transmission power.

To achieve the above and other objects, there is provided a method for determining a data rate of a user equipment (UE) for an enhanced uplink dedicated channel (EUDCH) service by a Node B in a mobile communication system having the UE transmitting UE transmission power class information to a radio network controller (RNC), the RNC having a table for storing total transmission power corresponding to a transmission power class of the UE, and the Node B supporting the EUDCH service of the UE. The method comprises the steps of receiving at the Node B uplink channel condition information of the UE from the UE, and receiving total transmission power of the UE from the RNC; and determining a data rate of the UE considering the received uplink channel condition information and total transmission power.

Preferably, the uplink channel condition information of the UE is transmission power information of the UE.

Further, the method comprises the step of calculating transmission power margin information of the UE using the total transmission power and the transmission power information, and determining a data rate of the UE considering the transmission power information and the transmission power margin information.

To achieve the above and other objects, there is provided a method for determining a data rate of a user equipment (UE) for an enhanced uplink dedicated channel (EUDCH) service by a Node B in a mobile communication system having the UE transmitting UE transmission power class information to a radio network controller (RNC), the RNC having a table for storing total transmission power corresponding to a transmission class of the UE, the Node B supporting the EUDCH service of the UE. The method comprises the steps of receiving at the Node B transmission power margin information of the UE from the UE, receiving at the Node B total transmission power from the RNC; and determining a data rate of the UE considering the transmission power margin information and the total transmission power.

To achieve the above and other objects, there is provided a method for determining a data rate of a user equipment (UE) for an enhanced uplink dedicated channel (EUDCH) service by a Node B in a mobile communication system having the UE and the Node B supporting the EUDCH service of the UE. The method comprises the steps of receiving at the Node B transmission power information and transmission power margin information of the UE from the UE; and determining a data rate of the UE considering the transmission power information and the transmission power margin information.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENT

Figure 1:
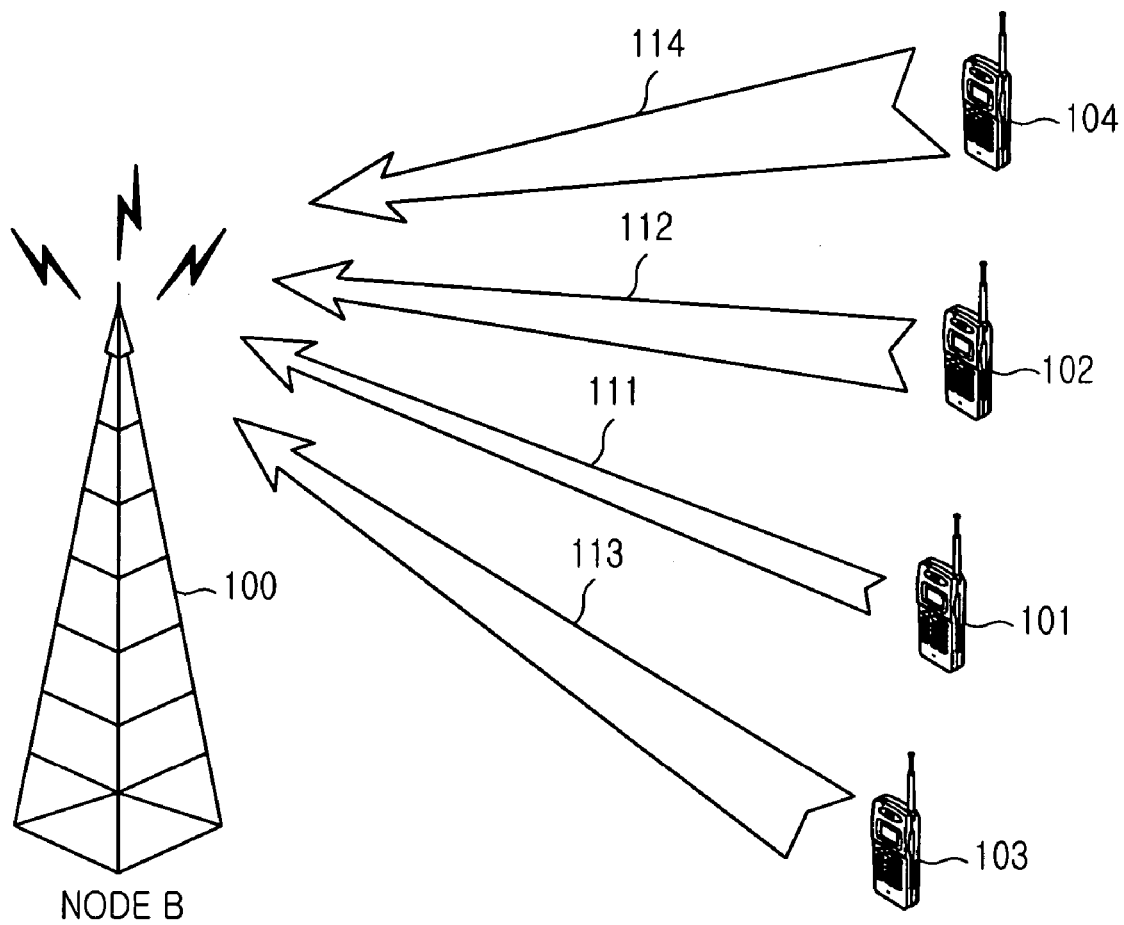
FIG. 1 is a diagram schematically illustrating a situation using EUDCH.

Several preferred embodiments of the present invention will now be described in detail with reference to the annexed drawings. In the drawings, the same or similar elements are denoted by the same reference numerals even though they are depicted in different drawings. In the following description, a detailed description of known functions and configurations incorporated herein has been omitted for conciseness.

The present invention is provided on the assumption that an enhanced uplink dedicated channel (EUDCH) is used in a wideband code division multiple access (WCDMA) communication system. The EUDCH, as described in the related art section, is characterized by HARQ, AMC, Node B scheduling, short TTI length, etc.

The present invention is applied to a system supporting Node B control scheduling and short TTI length among new technologies applied to the EUDCH. The "short TTI length" means using TTI having a shorter length such as 2 ms and 3.33 ms, compared with existing dedicated data channel's TTI having a length of a minimum of 10 ms. A decrease in length of TTI means that a transmission data block, i.e., a transmission data unit, becomes shortened. If the transmission data unit becomes shortened, a scheduling period should also be shortened proportionally. As a result, this is suitable to scheduling by a Node B. Of course, the present invention can be applied in the same way even in an environment where the existing 10 ms TTI is used.

The "Node B scheduling," as described in the related art section, means scheduling an uplink packet channel by a Node B. In other words, the Node B estimates transmission situations or channel conditions of several UEs supporting EUDCH included in the Node B. Through the estimated transmission situations or channel conditions, the Node B determines resources to be assigned to respective UEs. The resources include a resource regarding how long the transmission will be permitted, and a resource regarding which data rate will be assigned.

In performing scheduling, the Node B needs information on a transmission power margin of a UE, an amount of data stored in a buffer of the UE, or an uplink channel condition of the UE. As indicated as a disadvantage in the related art section, if the Node B has information on a transmission power margin of a UE but has no uplink channel condition information of the UE, its scheduling performance is decreased. In contrast, even when the Node B has the uplink channel condition information of the UE but has no information on a transmission power margin of the UE, its scheduling performance is decreased.

That is, in order to perform optimized scheduling on respective UEs supporting EUDCH, the Node B must consider both the transmission power margin and uplink channel information of the UE.

Therefore, the present invention aims at optimizing Node B scheduling by efficiently delivering the above two types of information that the UE has to the Node B through signaling.

As a method for sending the two types of information to the Node B, there is a possible method in which the UE directly transmits both of the two types of information to the Node B over a physical channel. This method will be described later with reference to a first embodiment.

Meanwhile, the two types of information, i.e., transmission power information and transmission power margin information as uplink channel information, have the following relation defined as $$Tx_{power} + Tx_{margin} = Tx_{total\_power} \quad (1)$$

Referring to Equation (1), the total transmission power can be expressed as the sum of the transmission power and a transmission power margin value.

However, a value of the total transmission power can be determined by transmission power class information of the UE that each UE transmits to the Node B according to its UE capability. That is, each UE is designated a unique UE transmission power class, and this means that in Equation (1), the UE's total transmission power value is individually designated to a UE. Therefore, if the Node B can determine the total transmission power by the UE transmission power class information, it is possible to obtain an effect of having both of the two types of information by sending only one of the two types of information to the Node B rather than transmitting both the transmission power information and the transmission power margin information of the UE to the Node B.

Here, the total transmission power is determined by a table illustrating a relation between the UE transmission power class and the total transmission power, which will be described below. Meanwhile, although the table is commonly included in a radio network controller (RNC), if the table values are stored in a Node B, the Node B can obtain the total transmission power.

That is, the RNC transmits a transmission power class received from a UE to the Node B through an NBAP (Node B Application Part) message, and the Node B reads the total transmission power corresponding to the transmission class from the table. The method in which the Node B having the table calculates the total transmission power from the transmission power class will be described below in detail with reference to second and third embodiments.

In addition, there is a possible method for directly receiving the transmission power class information from the UE instead of the RNC. That is, if the UE transmits the transmission power class information to the Node B, the Node B can read the total transmission power from the transmission power class information using the table additionally included therein. Thereafter, the Node B can efficiently schedule a data rate of the UE from the transmission power information received from the UE, or the transmission power margin information and the total transmission power information. A detailed description of this method will be made below with reference to fourth and fifth embodiments.

In the above methods where the Node B calculates the total transmission power by receiving transmission power class information, a table for storing correlation values between the two types of information must be included in the Node B. Therefore, if the RNC reads the total transmission power using the table commonly stored in the RNC and sends the Node B the read total transmission power, information instead of the transmission power class information, the Node B is not required to include the table. This method will be described below in detail with reference to sixth and seventh embodiments.

The first to seventh embodiment of the present invention, for most efficiently signaling the two types of information, i.e., the UE's transmission power information (or UE's transmission power margin information) and the UE's total transmission power information, to the Node B will now be described with reference to FIGS. 4 to 10.

First Embodiment

The first embodiment provides a method for directly transmitting the above-mentioned two types of information to a Node B over a physical channel. The two types of information, as mentioned above, refer to UE's uplink channel condition information and UE's transmission power margin information. The uplink channel condition information can represent UE's transmission power information, or other information including the channel condition information. The first embodiment will now be described below with reference to FIG. 4.

Figure 2:
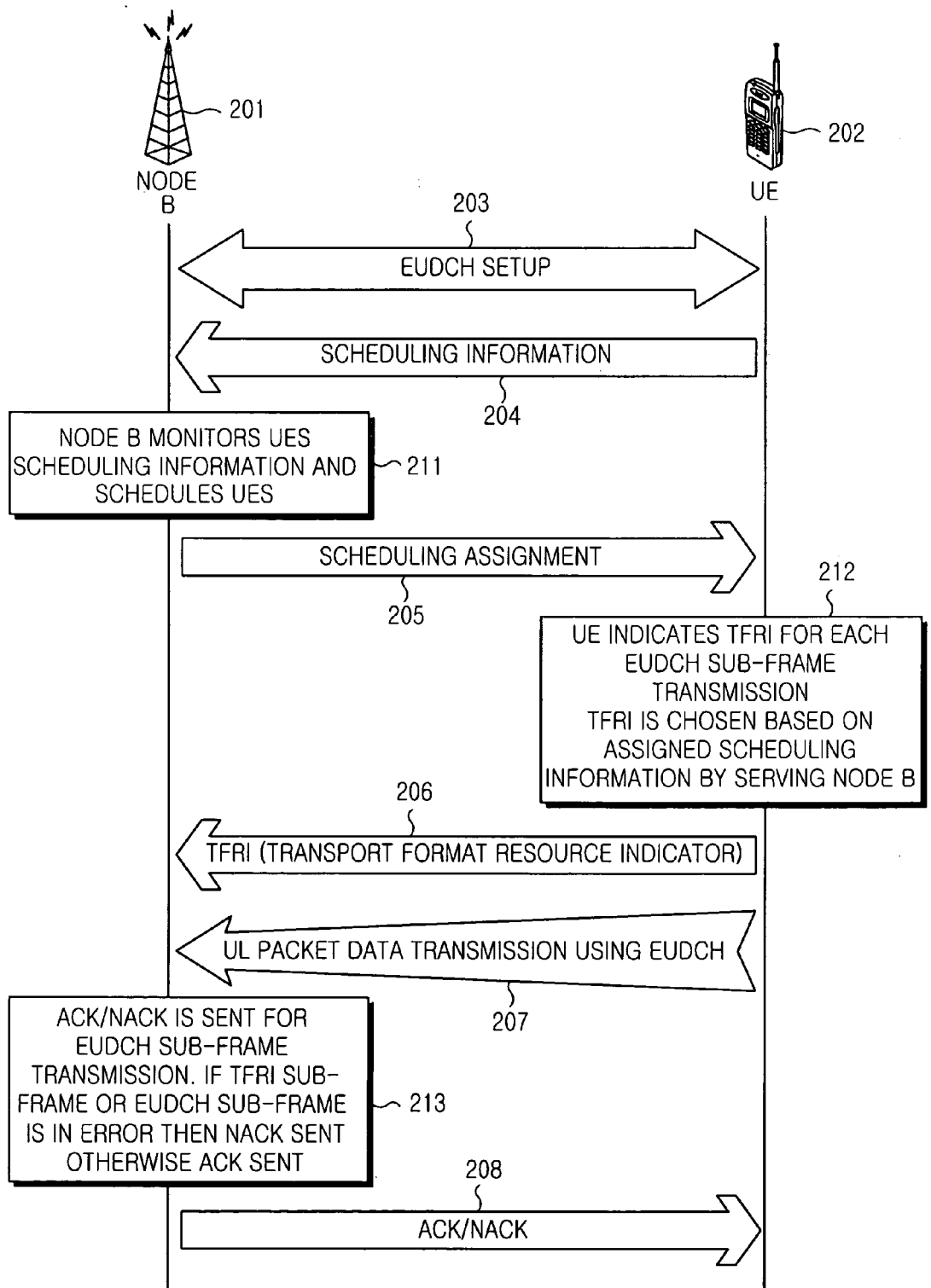
FIG. 2 is a diagram illustrating a fundamental procedure for transmitting and receiving EUDCH.
Figure 4:
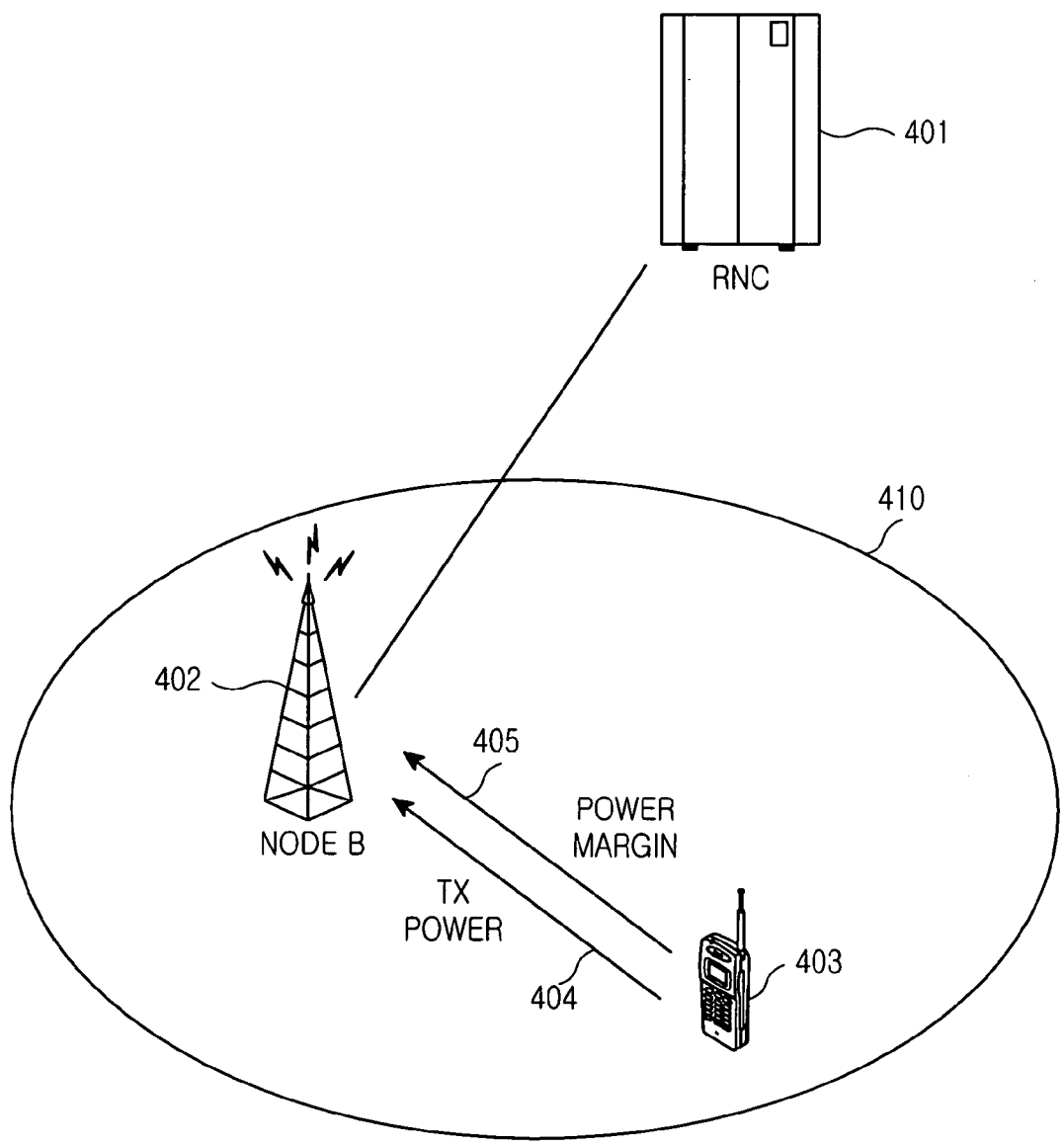
FIG. 4 is a diagram illustrating a system configuration according to a first embodiment of the present invention.

FIG. 4 schematically illustrates a system using EUDCH. An RNC 410 controls one or more Node Bs, and for the convenience of explanation, only one Node B 402 is illustrated herein. A UE 403 located in a cell area 410 of the Node B 402 exchanges EUDCHs with the Node B 402. Describing the fundamental EUDCH transmission/reception procedure described in conjunction with FIG. 2, the scheduling information transmitted from the UE 403 to the Node B 402 includes the UE's uplink channel condition information and the UE's transmission power margin information. That is, in FIG. 4, the UE 403 transmits Tx Power 404, or the UE's uplink channel condition information, to the Node B 402 over a physical channel. Also, the UE 403 transmits its transmission power margin information to the Node B 402 over the physical channel. Through this process, the Node B 402 can acquire uplink channel condition information and transmission power margin information of the UE 403 and more efficiently perform scheduling, thereby increasing system capability for EUDCH.

The first embodiment has presented a method for simultaneously transmitting the two types of information, i.e., uplink channel condition information such as UE's transmission power and the UE's transmission power margin information, over the physical channel. The two types of information have a relation of Equation (1). That is, the sum of the two types of information becomes the available total transmission power of the UE.

For a UE used in a WCDMA communication system, a total of 4 types of transmission power values are defined according to UE capability, and the values are illustrated in Table 1 below.

Therefore, if a Node B has the UE transmission power class information and includes a table of Table 1, it is possible to obtain an effect of having both of the two types of information by sending one of the two types of information to the Node B, instead of transmitting both of the transmission power information and the transmission power margin information of the UE, as described in the first embodiment. Examples of the above method will be described below with reference to second to fifth embodiments.

First, a description will be made of a method for signaling the UE transmission power class information.

Figure 3:
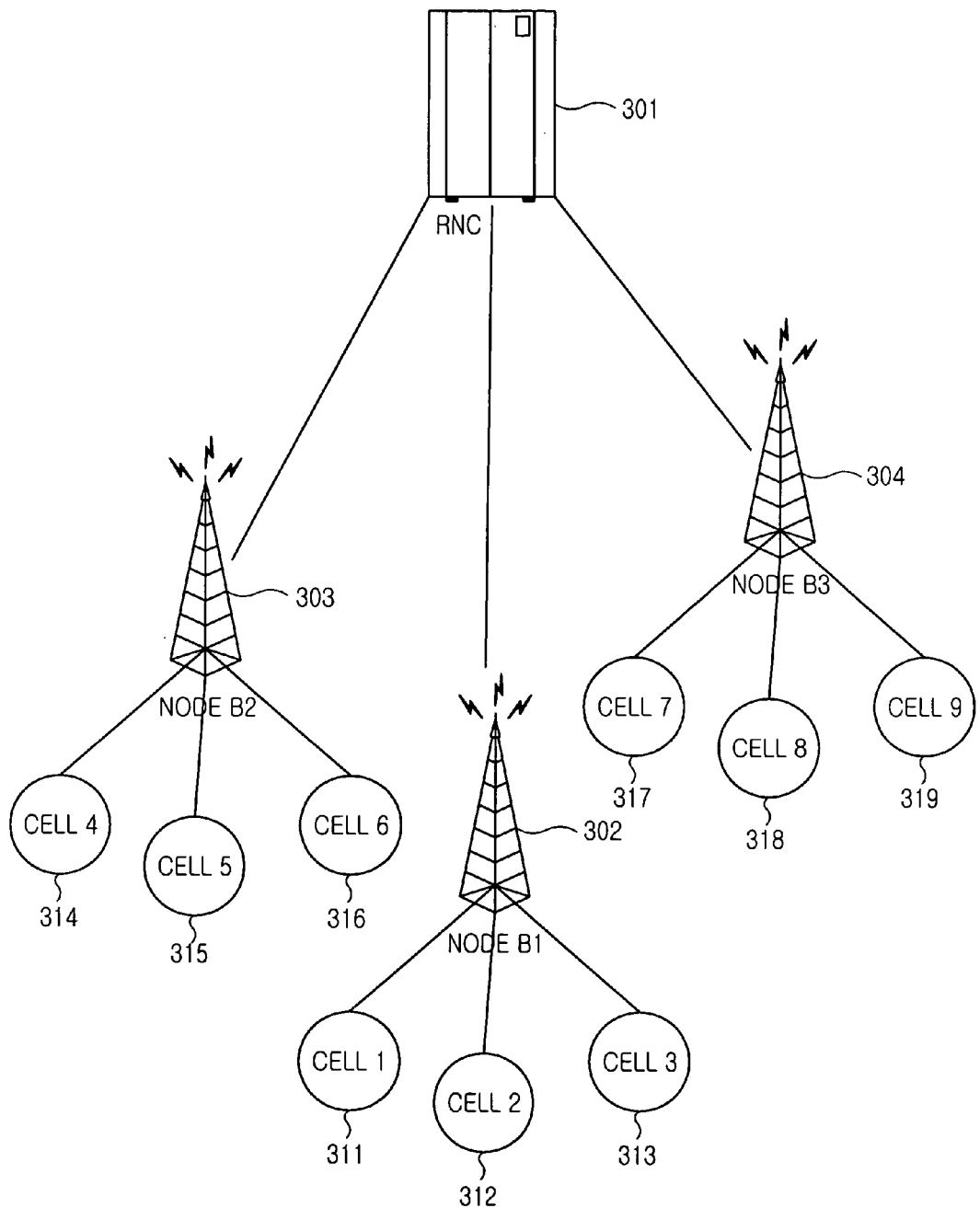
FIG. 3 is a diagram illustrating a fundamental configuration of a WCDMA radio access system.

UE transmission power class information of a particular UE is included in UE capability information and then delivered to an RNC controlling the UE through a radio resource control (RRC) message. FIG. 3 illustrates a structure of a radio access system in a WCDMA communication system. In FIG. 3, an RNC 301 controls Node Bs 302, 303 and 304, and each Node B controls one or more cells. In this structure, the Node B 302 has cells 311, 312 and 313, the Node B 303 has cells 314, 315 and 316, and the Node B 304 has cells 317, 318 and 319. If it is assumed that a particular UE performs communication in the cell 311, the UE transmits the above-stated UE capability information to the RNC 301 through an RRC message. Although the RRC message is delivered to the RNC via a Node B, the Node B cannot know the information.

Figure 5:
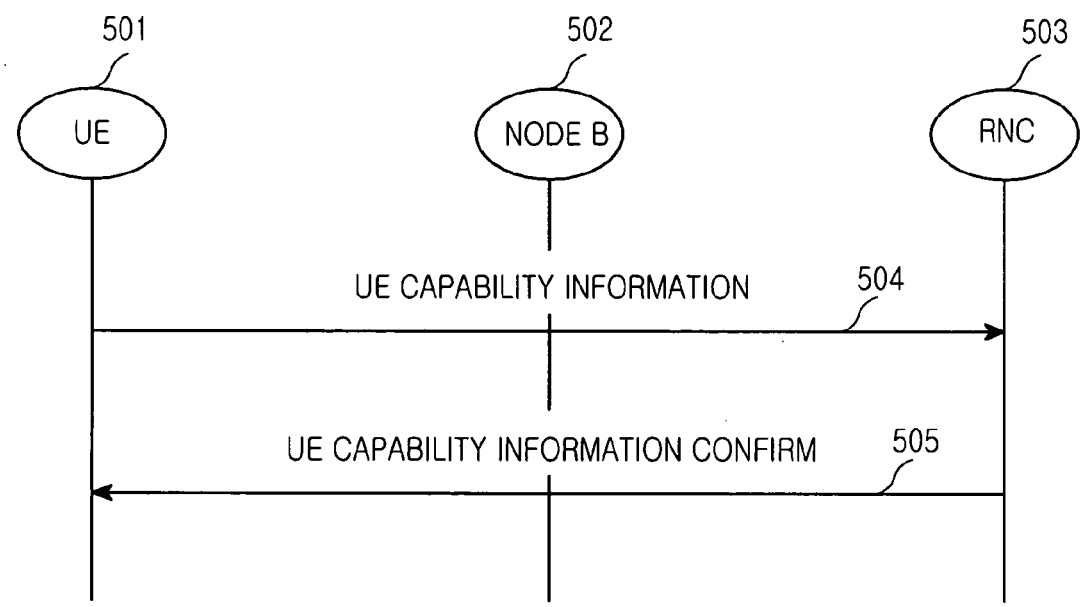
FIG. 5 is a diagram illustrating a procedure for signaling existing UE capability information through an RRC message.

Meanwhile, FIG. 5 illustrates a flow of signaling the RRC message. Referring to FIG. 5, a UE 501 transmits an RRC message entitled "UE capability information" to an RNC 503 when necessary, in step 504. Here, a Node B 502 merely turns the RRC message over to the RNC 503, but cannot read the RRC message or have the information. Upon receiving the RRC message, the RNC 503 transmits in step

TABLE 1

|  | Power Class 1 | | Power Class 2 | | Power Class 3 | | Power Class 4 | |
| --- | --- | --- | --- | --- | --- | --- | --- | --- |
| Operating Band | Power (dBm) | Tol (dB) | Power (dBm) | Tol (dB) | Power (dBm) | Tol (dB) | Power (dBm) | Tol (dB) |
| Band I | +33 | +1/−3 | +27 | +1/−3 | +24 | +1/−3 | +21 | +2/−2 |
| Band II | — | — | — | — | +24 | +1/−3 | +21 | +2/−2 |
| Band III | — | — | — | — | +24 | +1/−3 | +21 | +2/−2 |

In Table 1, the total transmission power and a power error limit of a UE are determined according to UE's transmission power class. That is, in a UE having a UE transmission power class 3 (Power Class 3), the total transmission power available for the UE is +24 dBm, and its error limit ranges from +1 dB to −3 dB. In Table 1, "Operating and" means a WCDMA band in use, and is divided into three bands. Only two power lasses of UE transmission power class 3 (Power Class 3) and UE transmission power class 4 (Power Class 4) are defined as UE transmission power classes used in a current-version WCDMA communication system.

As described above, each UE is designated one of the UE transmission power classes defined in Table 1. This means that each UE has a different UE total transmission power value of Equation (1).

505 an RRC message entitled "UE capability information confirm" to the UE 501 in order to confirm receipt of the message. After completion of the process, the RNC 503 can acquire UE capability information for the UE 501.

Herein, types of the RRC messages are illustrated. Table 2 below shows detailed information of the RRC message called "UE capability information" transmitted in step 504 of FIG. 5. Of information elements (IEs) of Table 2, a 'UE radio access capability' message is shown in detail in Table 3 below. Of IEs included in the 'UE radio access capability' message, an 'RF capability FDD' message is shown in detail in Table 4 below, and of IEs included in the 'RF capability FDD' message, 'UE power class' information represents the above-stated UE's total transmission power information. Table 2 below shows a detailed format of the RRC message called "UE capability information confirm" transmitted in step 505 of FIG. 5.

TABLE 2

| Information Element/Group name | Need | Multi | Type and reference | Semantics description |
|---|---|---|---|---|
| Message Type | MP | | Message Type | |
| UE Information elements | | | | |
| RRC transaction identifier | OP | | RRC transaction Identifier 10.3.3.36 | |
| Integrity check info | CH | | Integrity check info 10.3.3.16 | Integrity check info is included if integrity protection is applied |
| UE radio access capability | OP | | UE radio access capability 10.3.3.42 | |
| UE radio access capability extension | OP | | UE radio access capability extension 10.3.3.42a | |
| Other Information elements | | | | |
| UE system specific capability | OP | 1 to <maxInterSysMessages> | | |
| >Inter-RAT UE radio access capability | MP | | Inter-RAT UE radio access capability10.3.8.7 | |

Of IEs of Table 2, a 'UE radio access capability' message is shown in detail in Table 3 below.

TABLE 3

| Information Element/Group name | Need | Multi | Type and reference | Semantics description | Version |
|---|---|---|---|---|---|
| Access stratum release indicator | MP | | Enumerated(R99) | Indicates the release of the UE according to [35]. The IE also indicates the release of the RRC transfer syntax supported by the UE.. | |
| | CV-not_rrc_connectionSetupComplete | | Enumerated(REL-4) | 15 spare values are needed. | REL-4 |
| DL capability with simultaneous HS-DSCH configuration | OP | | Enumerated(32 kbps, 64 kbps, 128 kbps, 384 kbps) | | REL-5 |
| PDCP capability | MP | | PDCP capability 10.3.3.24 | | |
| RLC capability | MP | | RLC capability 10.3.3.34 | | |
| Transport channel capability | MP | | Transport channel capability 10.3.3.40 | | |
| RF capability FDD | OP | | RF capability FDD 10.3.3.33 | | |
| RF capability TDD | OP | | RF capability TDD 10.3.3.33b | One "TDD RF capability" entity shall be included for every Chip | |

TABLE 3-continued

| Information Element/Group name | Need | Multi | Type and reference | Semantics description | Version |
|---|---|---|---|---|---|
| | | | | rate capability supported. | |
| | | 1 to 2 | | | REL-4 |
| Physical channel capability | MP | | Physical channel capability 10.3.3.25 | | |
| UE multi-mode/multi-RAT capability | MP | | UE multi-mode/multi-RAT capability 10.3.3.41 | | |
| Security capability | MP | | Security capability 10.3.3.37 | | |
| UE positioning capability | MP | | UE positioning capability 10.3.3.45 | | |
| Measurement capability | CH-fdd_req_sup | | Measurement capability 10.3.3.21 | | |

Of IEs included in the 'UE radio access capability' message, an 'RF capability FDD' message is shown in detail in Table 4 and Table 5 below, and of IEs included in the 'RF capability FDD' message, 'UE power class' information represents the above-stated UE's total transmission power information.

TABLE 4

| Information Element/Group name | Need | Multi | Type and Reference | Semantics description | Version |
|---|---|---|---|---|---|
| UE power class | MP | | Enumerated (1..4) | as defined in [21] | |
| Tx/Rx frequency separation | MP | | Enumerated(190, 174.8–205.2, 134.8–245.2) | In MHz as defined in [21]. NOTE: Not applicable if UE is not operating in frequency band a (as defined in [21]). | |

TABLE 5

| Information Element/Group name | Need | Multi | Type and reference | Semantics description |
|---|---|---|---|---|
| Message Type | MP | | Message Type | |
| UE information elements | | | | |
| RRC transaction identifier | MP | | RRC transaction identifier 10.3.3.36 | |
| Integrity check info | CH | | Integrity check info 10.3.3.16 | Integrity check info is included if integrity protection is applied |

Hitherto, a description has been made of a method for delivering UE capability information containing the UE total transmission power information from the UE to the RNC. The second and third embodiments of the present invention provide a method for minimizing information transmitted from a UE to a Node B over a physical channel by enabling transmission of the UE total transmission power information that the RNC acquires through the above process, from the RNC to the Node B.

Second Embodiment

The second embodiment will now be described below. In this embodiment, a UE sends only uplink channel condition information such as uplink transmission power over a physical channel. On the other hand, a Node B receives the UE's total transmission power information from an RNC through Iub signaling. A message signaled through Iub connection is called an NBAP (Node B Application Part) message. For the NBAP message necessary for a newly-defined EUDCH, a new message can be defined or the existing messages can be partially modified. The UEs' total transmission power information of the RNC is included in the NBAP messages necessary for the EUDCH before being transmitted. The UEs are also UEs desiring to use the EUDCH.

Figure 7:
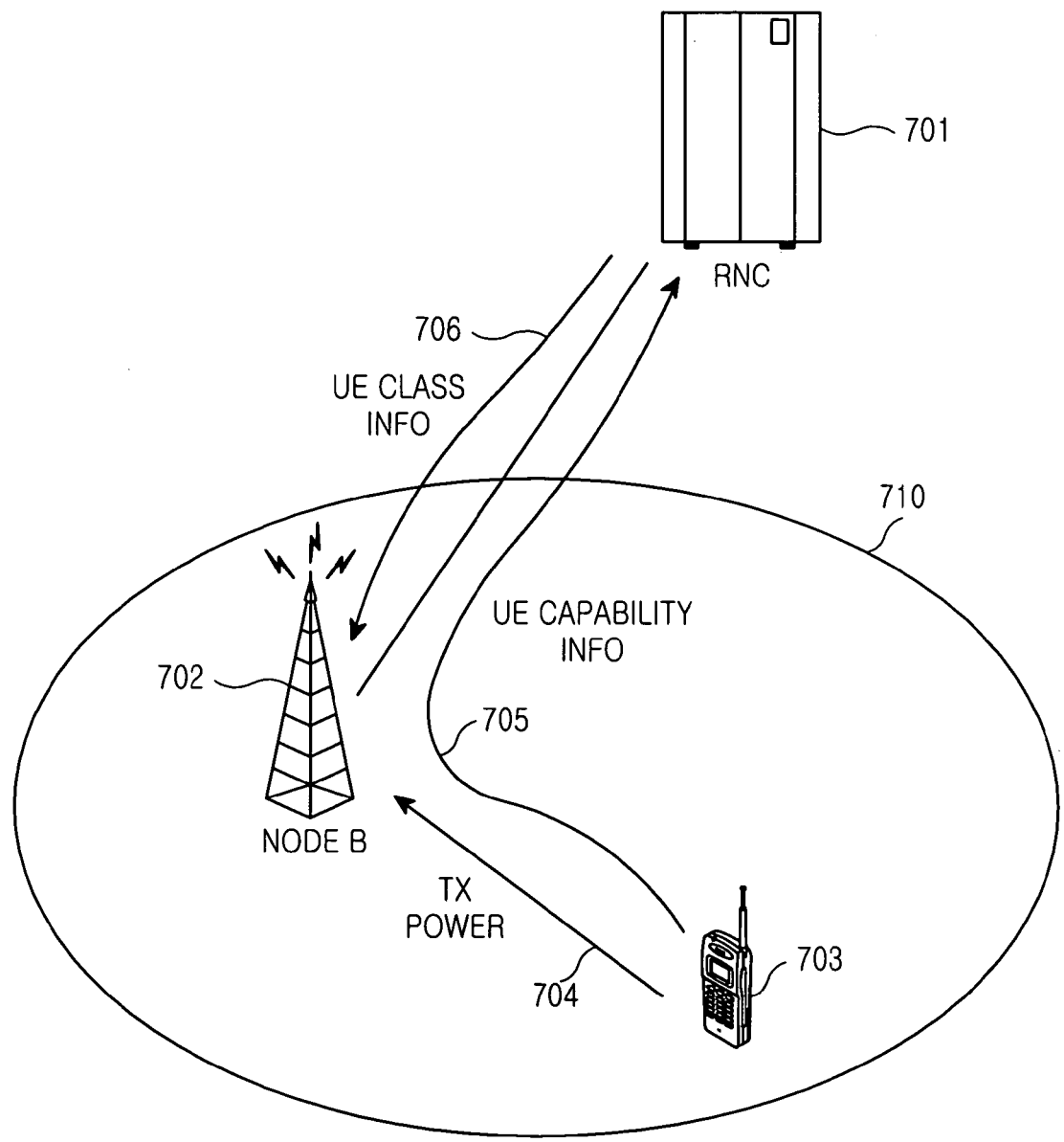
FIG. 7 is a diagram illustrating a system configuration according to a second embodiment of the present invention.

FIG. 7 is a detailed diagram illustrating the method proposed in the second embodiment. In FIG. 7, a UE 703 is receiving an EUDCH service, and an RNC 701 controls the UE 703. The RNC 701 can determine UE capability of the UE 703 through an RRC message 705 called "UE capability information," and can determine the total transmission power information of the UE 703 with UE power class information included in the UE capability information. When the EUDCH service is initiated, the RNC 701 sends the total transmission power information of the UE 703, stored therein, to a Node B 702 through an NBAP message as represented by reference numeral 706. In transmitting the EUDCH, the UE 703 periodically sends transmission power information 704 representing uplink channel condition information of the UE 703 to the Node B 702 using a physical channel. The Node B 702 then acquires the total transmission power information 706 and the current transmission power information 704 of the UE 703, so it can acquire transmission power margin information of the UE 703 through Equation (1). Therefore, as described above, the Node B 702 can acquire both the transmission power information and the transmission power margin information of UEs, thereby enabling more efficient and optimized scheduling.

Figure 6A:
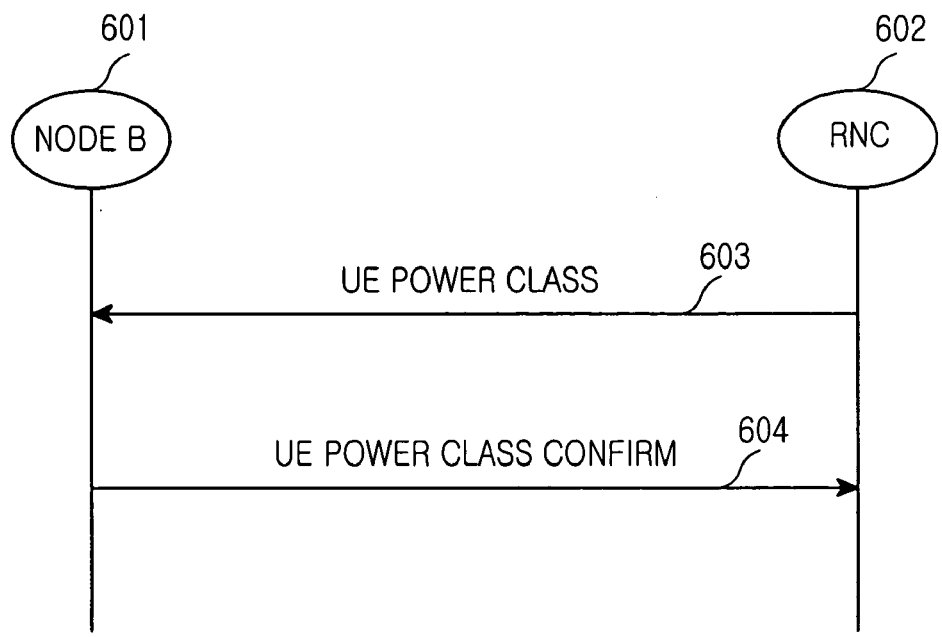
FIGS. 6A and 6B are diagrams illustrating Node B application part (NBAP) signaling procedures through Iub connection proposed by the present invention.

There are two possible methods in which the RNC sends the UE's total transmission power information to the Node B through an NBAP message. In a first method, UE's power class information is sent through the above message as done in the first embodiment of the present invention. That is, one of 4 classes is sent using only 2 bits. FIG. 6A illustrates a procedure for transmitting the above message. An RNC 602 sends an NBAP message to a Node B 601 in step 603, and the NBAP message includes UE power class information. In the present invention, the Node B 601 should have a table of Table 1 in its memory, and can determine an actual value of the UE's total transmission power by mapping the information received in step 603 through the NBAP message with Table 1. For example, if the NBAP message of step 603 contains information indicating that the UE's power class is Power Class 3, the Node B 601 can determine from Table 1 that Power Class 3 is 24 dBm, and can use this value.

Figure 6B:
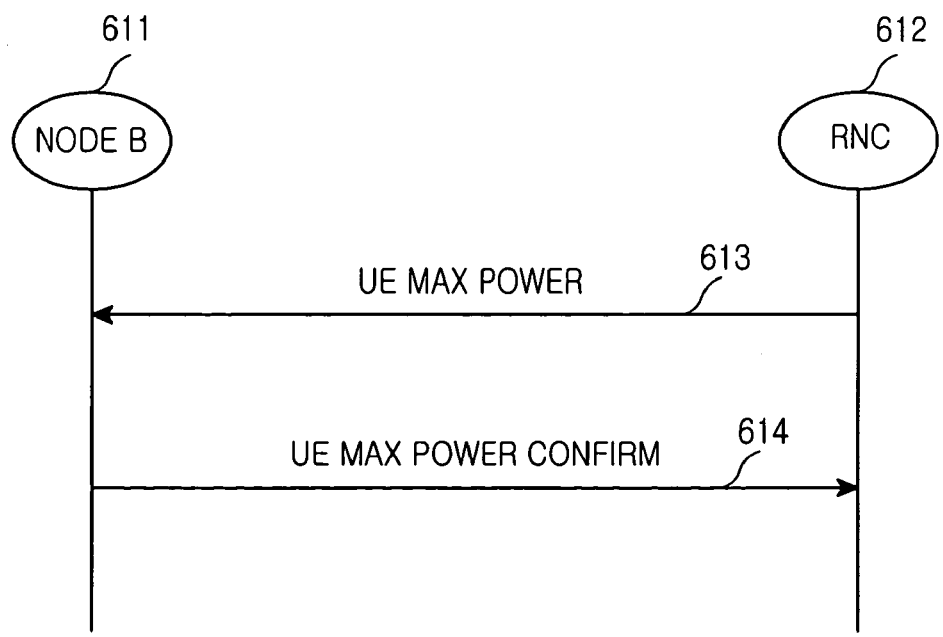

In a second method, the UE's maximum transmission power value is directly transmitted, and this can be described with reference to FIG. 6B. A Node B 611 is not required to have a table of Table 1 in its memory, so an RNC 612 directly transmits the UE's maximum transmission power value through an NBAP message in step 613. Compared with the first method, this method is larger in an amount of transmission information. However, this method is advantageous in that the Node B is not required to have the information of Table 1 in this memory.

An example of the second method will be described later with reference to a sixth embodiment.

The NBAP message should be necessarily transmitted from the RNC to the Node B when a UE performs handoff changing the connected Node B. Once the NBAP message is transmitted, additional message information is not required unless a Node B is changed or added.

Third Embodiment

The third embodiment will now be described below. In this embodiment, a UE sends only transmission power margin information over a physical channel. A Node B receives the UE's total transmission power information from an RNC via Iub connection through NBAP signaling. For the NBAP message necessary for a newly-defined EUDCH, a new message can be defined or the existing messages can be partially modified. The UEs' total transmission power information of the RNC is included in the NBAP messages necessary for the EUDCH before being transmitted. The UEs are also UEs desiring to use the EUDCH.

Figure 8:
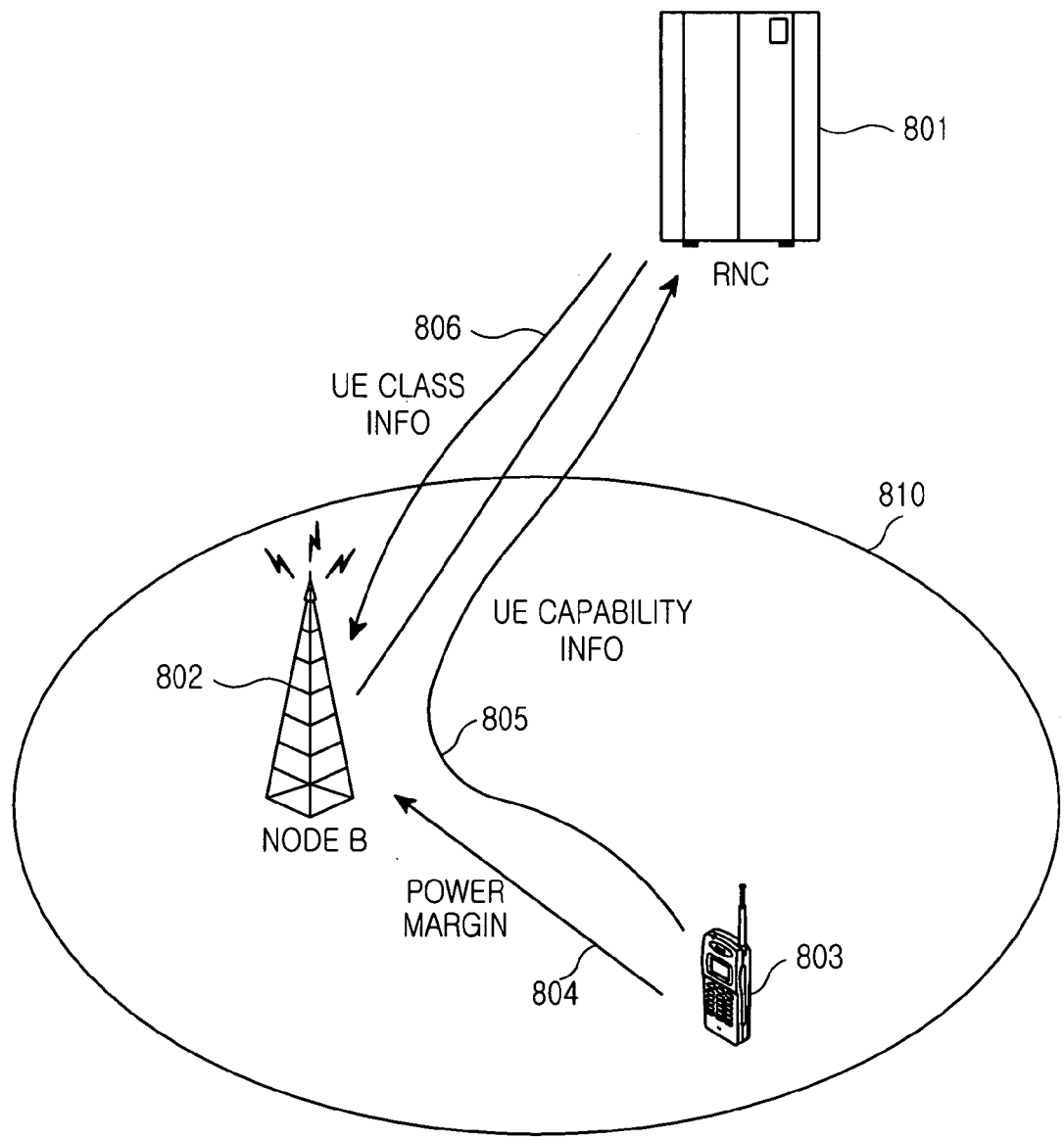
FIG. 8 is a diagram illustrating a system configuration according to a third embodiment of the present invention.
Figure 9:
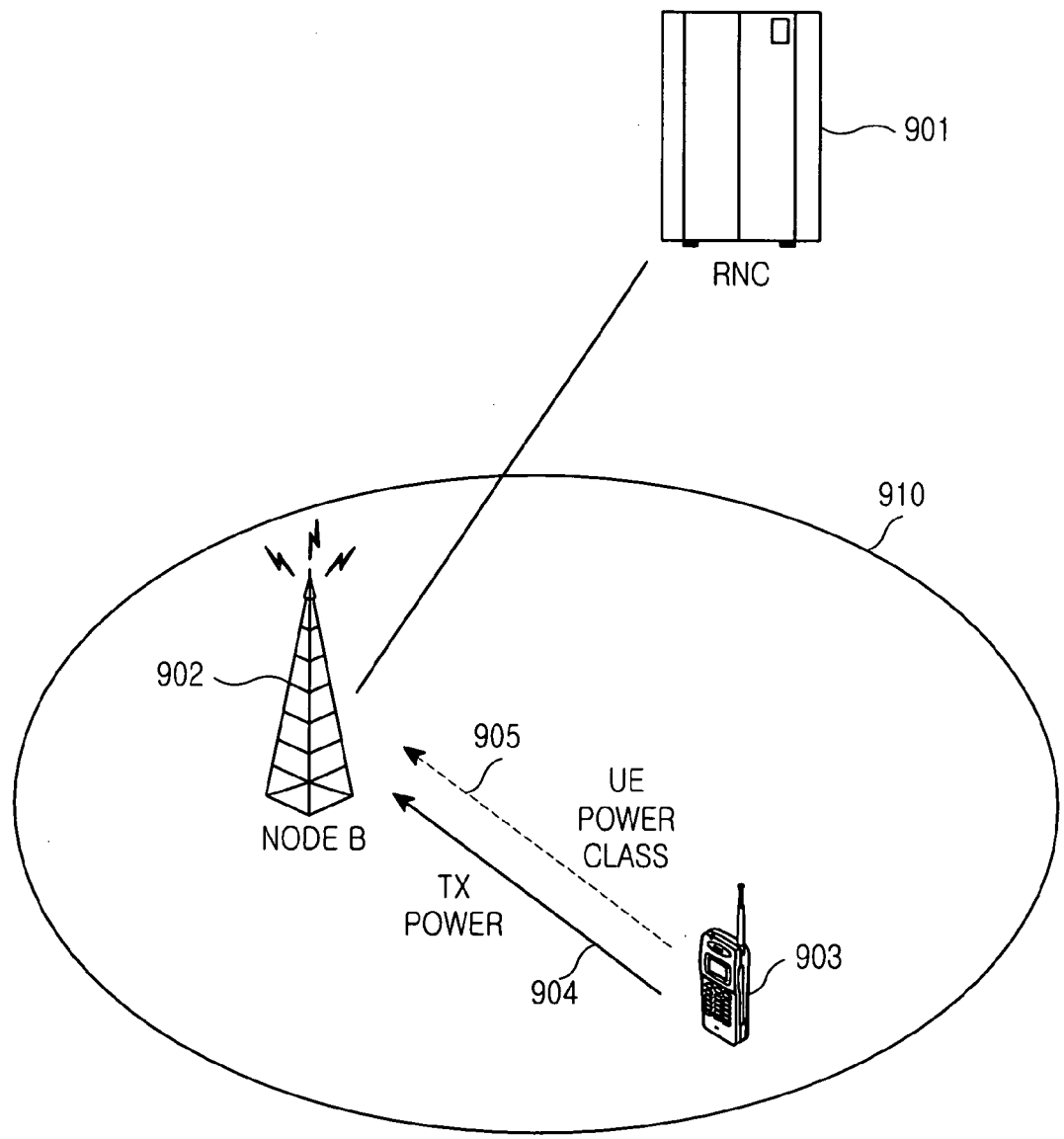
FIG. 9 is a diagram illustrating a system configuration according to a fourth embodiment of the present invention.
Figure 10:
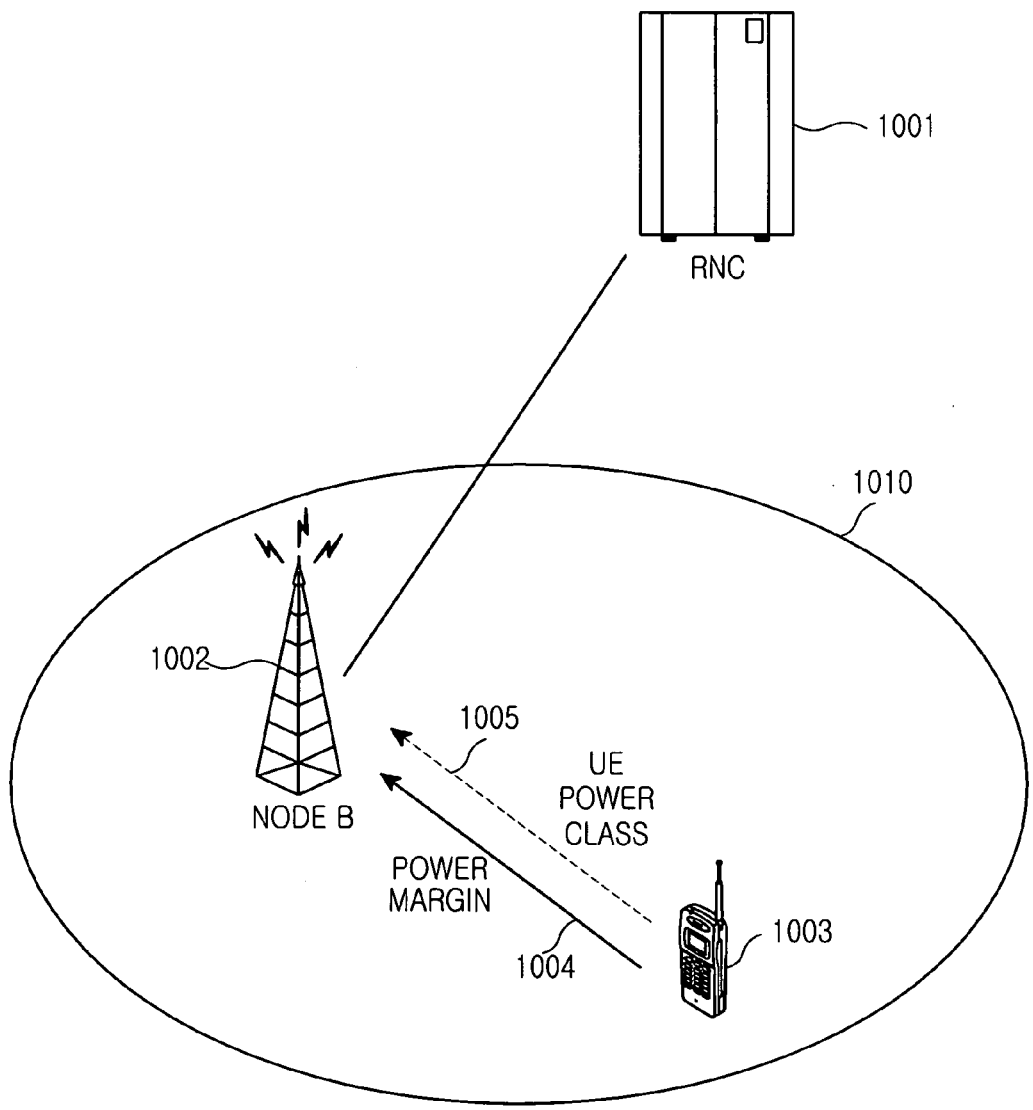
FIG. 10 is a diagram illustrating a system configuration according to a fifth embodiment of the present invention.

FIG. 8 is a detailed diagram illustrating the method proposed in the third embodiment. In FIG. 8, a UE 803 is receiving an EUDCH service, and an RNC 801 controls the UE 803. The RNC 801 can determine UE capability of the UE 803 through an RRC message 805 called "UE capability information," and can determine the total transmission power information of the UE 803 with UE power class information included in the UE capability information. When the EUDCH service is initiated, the RNC 801 sends the total transmission power information of the UE 803, stored therein, to a Node B 802 through an NBAP message 806. In transmitting the EUDCH, the UE 803 periodically sends transmission power margin information 804 of the UE 803 to the Node B 802 using a physical channel. The Node B 802 then acquires the total transmission power information 806 and the current transmission power margin information 804 of the UE 803, so it can acquire transmission power margin information representing uplink channel information of the UE 803 through Equation (1). Therefore, as described above, the Node B 802 can acquire both the transmission power information and the transmission power margin information of UEs, thereby enabling more efficient and optimized scheduling.

Even when the RNC sends the UE's total transmission power information to the Node B through an NBAP message, there are two possible methods as described in the second embodiment.

An example of the second method will be described later with reference to a seventh embodiment.

Two different modified methods of the first embodiment will now be described below with reference to the fourth and fifth embodiments.

Fourth Embodiment

The fourth embodiment provides a method for directly transmitting UE's transmission power information representing an uplink channel condition and UE's power class information to a Node B over a physical channel. The Node B can determine UE's transmission power information and UE's transmission power margin information, using the above two types of information and Equation (1). This embodiment will be described below with reference to FIG. 9.

An RNC 901 controls a Node B 902, and a UE 903 exchanges EUDCHs with the Node B 902. The UE 903 sends uplink channel condition information 904 such as UE transmission power to the Node B 902 over a physical channel. Also, the UE 903 sends power class information 905 included in its UE capability information to the Node B 902 over a physical channel. The power class information, as described in the first and third embodiments, needs only two bits, and in this case, the Node B must include a table of Table 1 in its memory. In addition, the information 904 represented by a solid line in FIG. 9 must be periodically delivered to he Node B 902, whereas the power class information 905 represented by a dotted line can be delivered to the Node B 902 only once. That is, only when a Node B is changed or added, the power class information 905 is transmitted. This is because the UE transmission power information 904 varies with the passage of time, whereas the power class information 905 maintains its value.

Through the above process and Equation (1), the Node B 902 can acquire UEs' transmission power information and UEs' transmission power margin information and more efficiently perform scheduling, leading to an increase in system capability for EUDCH.

Fifth Embodiment

The fifth embodiment provides a method for directly transmitting UE's transmission power margin information and UE's total transmission power information to a Node B over a physical channel. The Node B can determine UE's uplink channel condition information and UE's transmission power margin information, using the above two types of information and Equation (1). This embodiment will be described below with reference to FIG. 10.

An RNC 1001 controls a Node B 1002, and a UE 1003 exchanges EUDCHs with the Node B 1002. The UE 1003 sends transmission power margin information of the UE 1003 to the Node B 1002 over a physical channel. Also, the UE 1003 sends power class information 1005 included in its UE capability information to the Node B 1002 over a physical channel. The power class information, as described in the second and third embodiments, needs only two bits, and in this case, the Node B must include a table of Table 1 in its memory. In addition, the transmission power margin information 1004 represented by a solid line in FIG. 10 must be periodically delivered to he Node B 1002, whereas the power class information 1005 represented by a dotted line in FIG. 10 can be delivered to the Node B 1002 only once. That is, only when a Node B is changed or added, the power class information 1005 is transmitted. This is because the UE's transmission power margin information 1004 varies with the passage of time, whereas the power class information 1005 maintains its value.

Through the above process and Equation (1), the Node B 1002 can acquire UEs' transmission power information and UEs' transmission power margin information and more efficiently perform scheduling, causing an increase in system capability for EUDCH.

Next, the sixth and seventh embodiments provide two methods in which a Node B does not have a separate table and directly receives UE's total transmission power information from an RNC.

Sixth Embodiment

Figure 11:
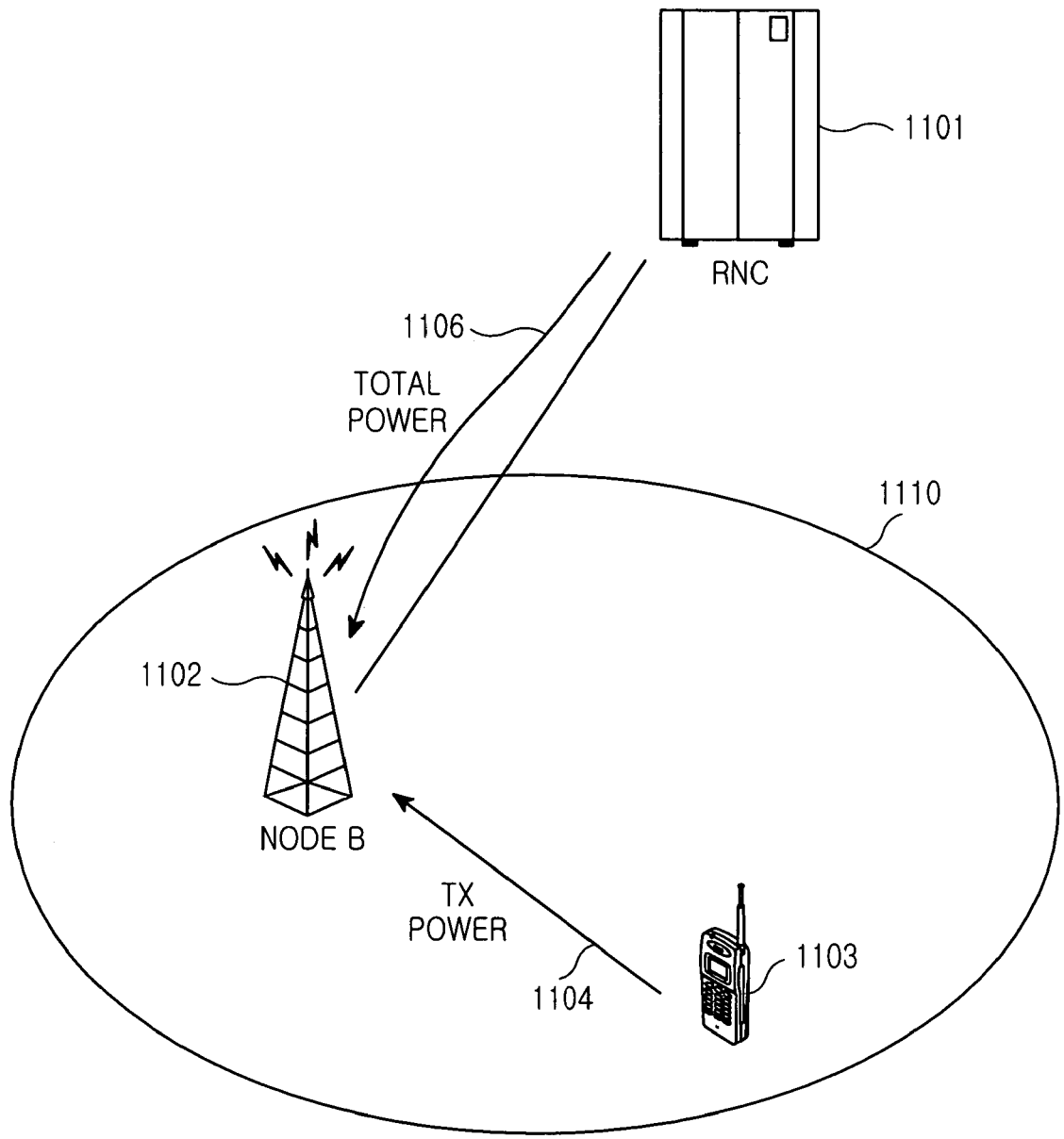
FIG. 11 is a diagram illustrating a system configuration according to a sixth embodiment of the present invention.

The sixth embodiment provides a method for transmitting UE's transmission power information representing an uplink channel condition to a Node B over a physical channel, and directly receiving the total transmission power information from an RNC in order to determine the UE's power margin information. The Node B can determine UE's transmission power information and UE's transmission power margin information, using the above two types of information and Equation (1). This embodiment will be described below with reference to FIG. 11.

An RNC 1101 controls a Node B 1102, and a UE 1103 exchanges EUDCHs with the Node B 1102. The UE 1103 sends uplink channel condition information 1104 such as UE transmission power to the Node B 1102 over a physical channel. In addition, the RNC 1101 transmits total transmission power information 1106 based on a power class included in UE capability information of the UE 1103, to the Node B 1102. The total transmission power information 1106, as described above, can be determined by the RNC 1101 from the power class information received from the UE 1103 based on Table 1.

Through the above process and Equation (1), the Node B 1102 can acquire UEs' transmission power information and UEs' transmission power margin information and more efficiently perform scheduling, thereby increasing system capability for EUDCH.

Seventh Embodiment

Figure 12:
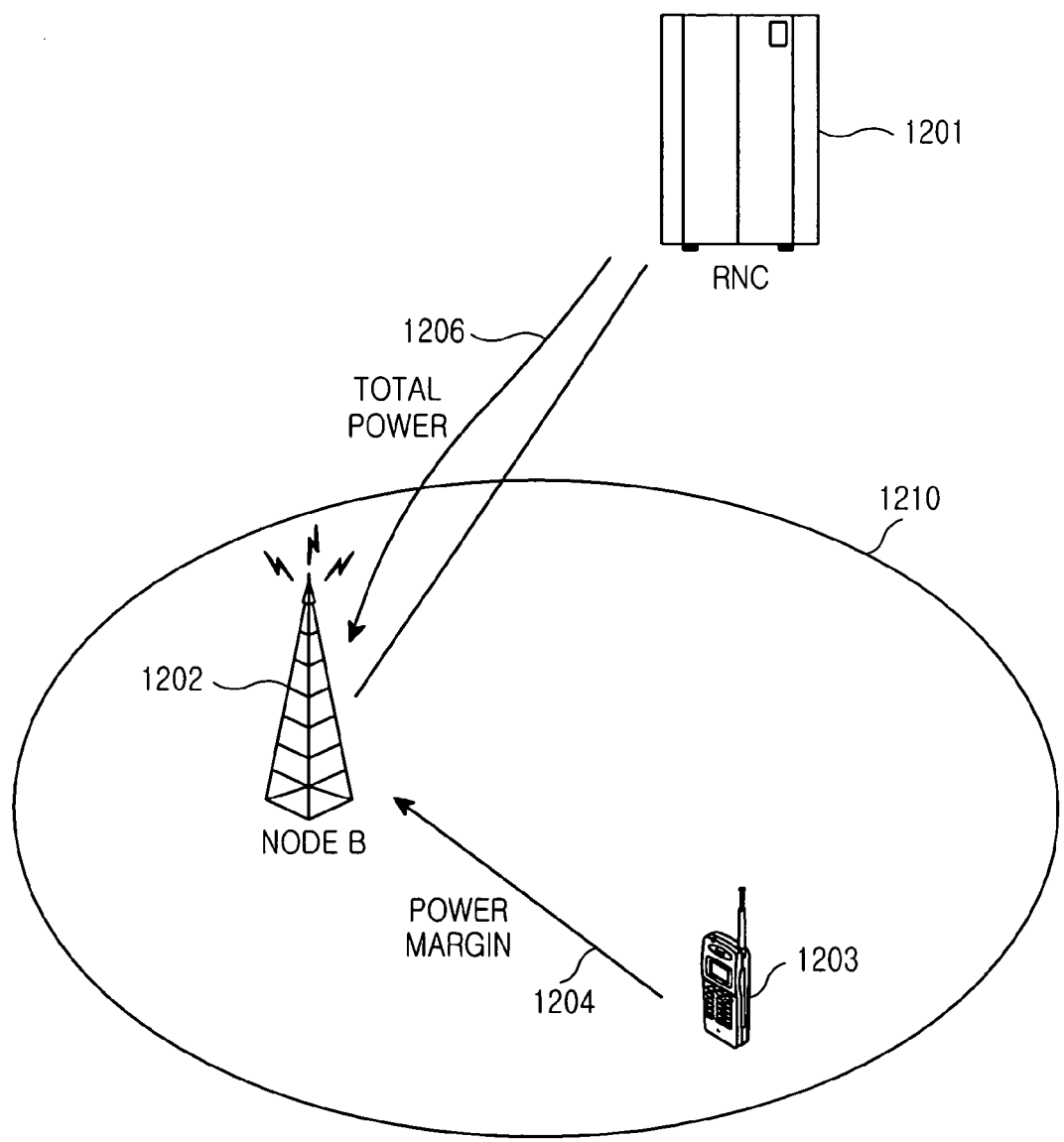
FIG. 12 is a diagram illustrating a system configuration according to a seventh embodiment of the present invention.

The seventh embodiment provides a method for transmitting UE's power margin information representing an uplink channel condition to a Node B over a physical channel, and directly receiving the total transmission power information from an RNC in order to determine the UE's transmission power information. The Node B can determine UE's transmission power information and UE's transmission power margin information, using the above two types of information and Equation (1). This embodiment will be described below with reference to FIG. 12.

An RNC 1201 controls a Node B 1202, and a UE 1203 exchanges EUDCHs with the Node B 1202. The UE 1203 sends transmission power margin information 1204 to the Node B 1102 over a physical channel. In addition, the RNC 1201 transmits total transmission power information 1206 based on a power class included in UE capability information of the UE 1203, to the Node B 1202. The total transmission power information 1206, as described above, can be determined by the RNC 1201 from the power class information received from the UE 1203 based on Table 1.

Through the above process and Equation (1), the Node B 1202 can acquire UEs' transmission power information and UEs' transmission power margin information and more efficiently perform scheduling, thereby increasing system capability for EUDCH.

The present invention has proposed a method for enabling a Node B to efficiently acquire information necessary for scheduling in order to secure its fast scheduling in a system using EUDCH. There are two possible methods for sending UE information to the Node B; one method sends the information over a physical channel and the other method sends the information through NBAP signaling. The present invention maximally reduces unnecessary information by properly combining the above methods through several embodiments, thereby enabling optimized efficient scheduling.

Therefore, based on the above methods, a Node B schedules a data rate of a UE considering UE's transmission power information and UE's transmission power margin information, thus variously implementing the scheduling method. For example, there can be a possible method for setting a data rate of the UE in proportion to the transmission power, and at the same time, efficiently readjusting the set data rate according to the UE's transmission power margin value.

In this regard, a description will now be made of the case where uplink transmission power of a UE is limited to a particular value by a Node B.

A Node B, as described above, can acquire total transmission power information from a UE according to UE power class information included in UE capability information. Therefore, for efficient resource management of a cell controlled by a Node B, the Node B limits a maximum value of uplink transmission power available for the UE to a particular value, and notifies the limited value to all UEs belonging to the cell or a particular UE. The maximum value of the uplink transmission power is defined as Maximum Allowed UL Tx Power, which has a value within the range shown in Table 6 below.

TABLE 6

| Information Element | Need | Multi | Type and reference | Semantics description |
| --- | --- | --- | --- | --- |
| Maximum allowed UL TX power | MP | | Integer(−5 0..33) | In dBm |

Therefore, a UE using EUDCH satisfies a relation, shown in Equation (2) below, between transmission power information and transmission power margin information, which are given as uplink channel information.

$$Tx_{power} + Tx_{margin} = Tx\textit{allowed\_power} \quad (2)$$

Referring to Equation (2), it can be understood that uplink transmission power of a UE is limited by Maximum Allowed UL Tx Power of a Node B.

Figure 13:
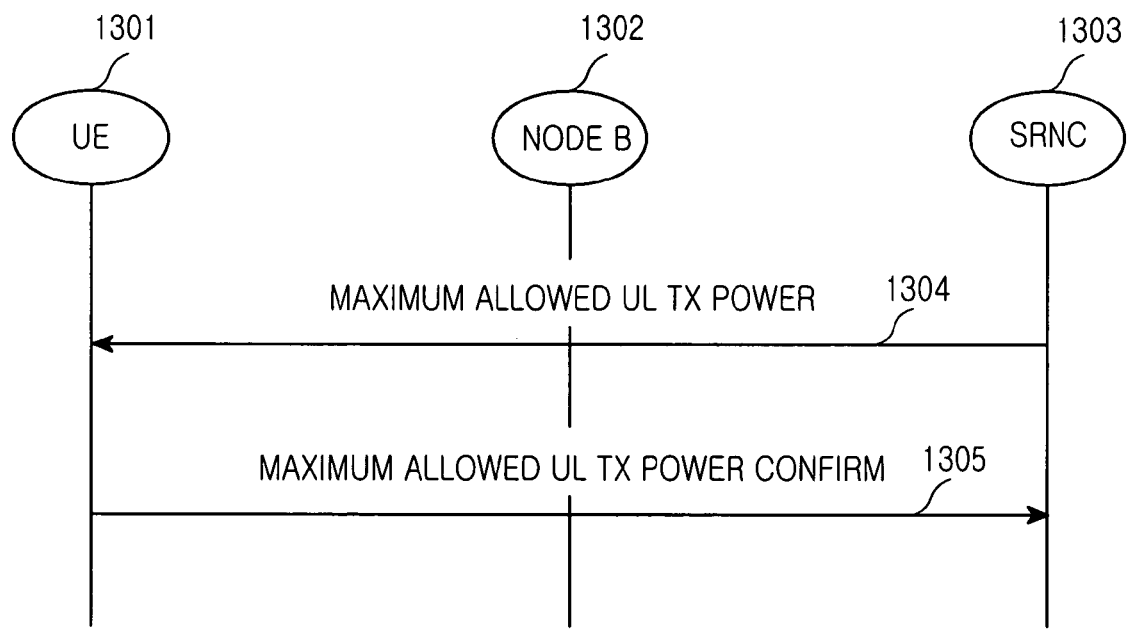
FIG. 13 is a diagram illustrating a procedure for signaling maximum allowed uplink transmission power information through a radio resource control (RRC) message according to another embodiment of the present invention.

FIG. 13 is a diagram illustrating a procedure for delivering the Maximum Allowed UL Tx Power from an SRNC 1303 to a UE 1301. The SRNC 1303 transmits the Maximum Allowed UL Tx Power to the UE 1301 via a Node B 1302 through an RRC message including a Maximum Allowed UL Tx Power IE, for example, Active Set Update, Handover to UTRAN Command, Physical Channel Reconfiguration, or Radio Bearer Setup message (Step 1304). The UE 1301 receiving the Maximum Allowed UL Tx Power information must use transmission power below the Maximum Allowed UL Tx Power during uplink transmission. As a confirm message for the Maximum Allowed UL Tx Power IE from the SRNC 1303, the UE 1301 can send a Maximum Allowed UL Tx Power Confirm IE to the SRNC 1303 via the Node B 1302 through an RRC message such as a Radio Bearer Setup Complete message (Step 1304).

Since the UE 1301 receiving the Maximum Allowed UL Tx Power information must determine its maximum uplink transmission power based on the received Maximum Allowed UL Tx Power information, the UE 1301 cannot use the total power acquired in the above embodiments from the total transmission power information based on the power class. Also, the Node B 1302 should not determine the maximum transmission power of the UE 1301 as the total power value acquired from the total transmission power information based on the power class. Thus, the Node B 1302 should know actual maximum transmission power of the UE 1031, and the SRNC 1303 must send the Maximum Allowed UL Tx Power value to the Node B 1302.

Figure 14:
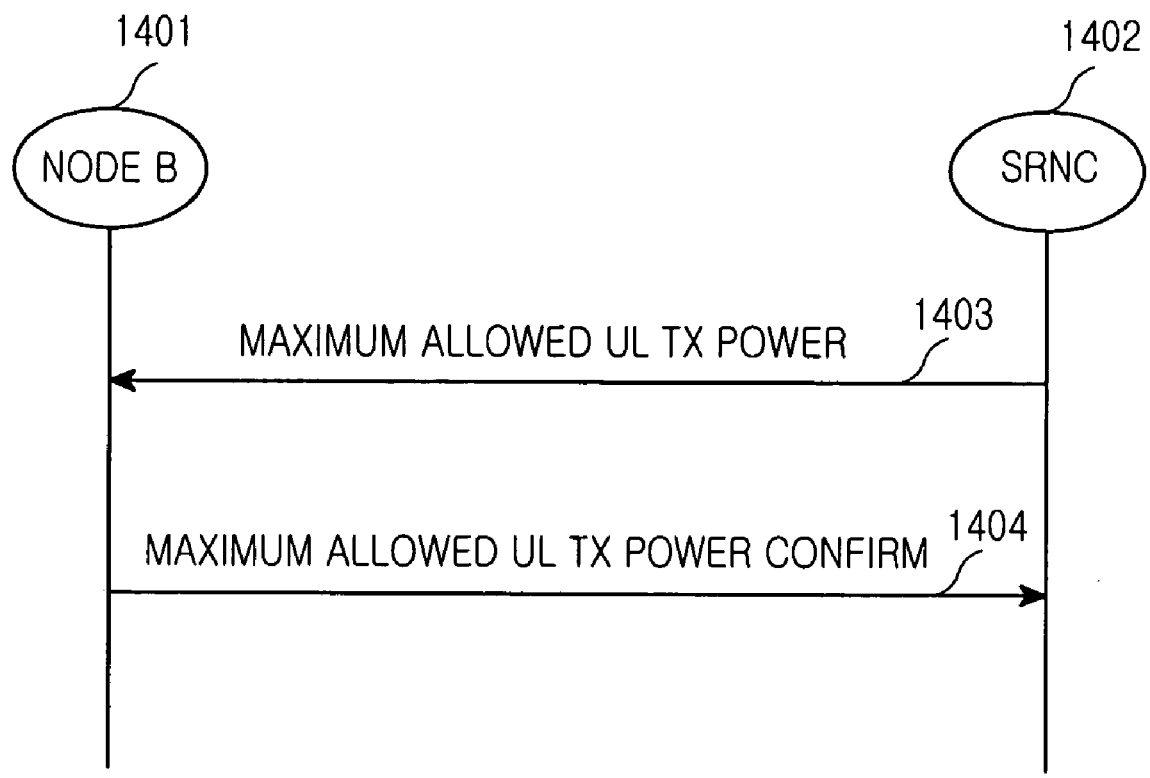
FIG. 14 is a diagram illustrating an NBAP signaling procedure through Iub connection according to another embodiment of the present invention.

In FIG. 14, an SRNC 1402 sends a total Maximum Allowed UL Tx Power value of a UE to a Node B 1401 via Iub signaling (Step 1403). In this case, the SRNC 1402 sends the total Maximum Allowed UL Tx Power value of the UE to the Node B 1401 through an NBAP (Node B Application Part) message. In response to the NBAP message, the Node B 1401 can send a Maximum Allowed UL Tx Power Confirm IE to the SRNC 1402 (Step 1404).

In this regard, eighth and ninth embodiments below provide a method for minimizing information delivered from a UE to a Node B over a physical channel, by enabling transmission of UE's Maximum Allowed UL Tx Power information the SRNC has acquired through the above process, from the SRNC to the Node B.

Eighth Embodiment

The eighth embodiment will now be described below. In this embodiment, a UE sends only uplink channel condition information such as uplink transmission power over a physical channel. A Node B receives Maximum Allowed UL Tx Power information of the UE from an RNC through Iub signaling. That is, the RNC includes UEs' Maximum Allowed UL Tx Power information determined for the UEs in NBAP messages necessary for EUDCH, before transmission. Here, the UEs are also UEs desiring to use the EUDCH.

Figure 15:
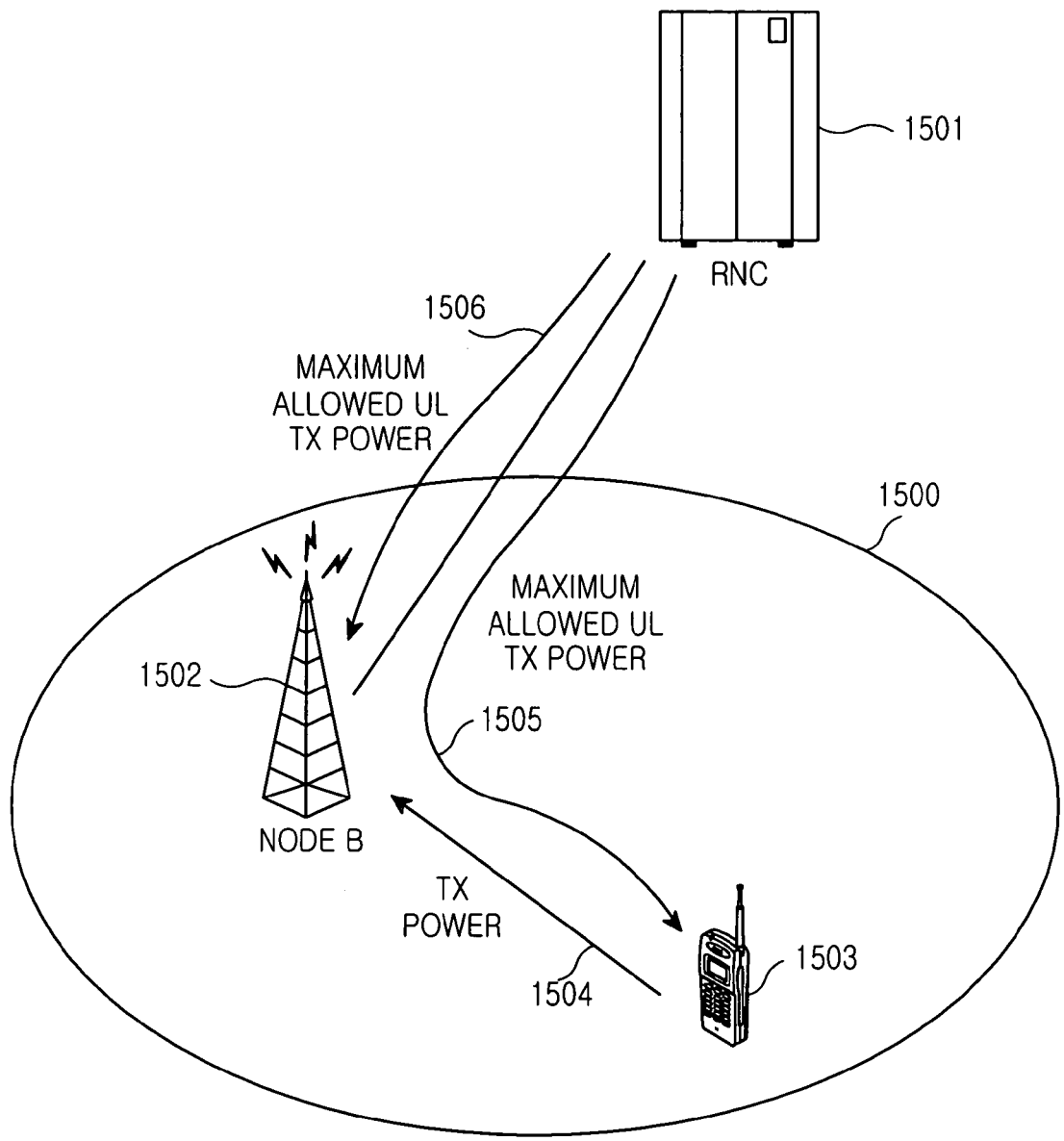
FIG. 15 is a diagram illustrating a system confirmation according to an eighth embodiment of the present invention.

FIG. 15 is a detailed diagram illustrating the method proposed in the eighth embodiment. In FIG. 15, a UE 1503 is receiving an EUDCH service, and an RNC 1501 controls the UE 1503. The RNC 1501 delivers a Maximum Allowed UL Tx Power IE 1505 to the UE 1503, and the UE 1503 then can acquired its available total transmission power information. When the EUDCH service is initiated, the RNC 1501 sends the total Maximum Allowed UL Tx Power information of the UE 1503, stored therein, to the Node B 1502 through an NBAP message 1506. In transmitting the EUDCH, the UE 1503 periodically sends transmission power information 1504 representing uplink channel condition information of the UE 1503 to the Node B 1502 using a physical channel. Then the Node B 1502 acquires Maximum Allowed UL Tx Power information 1506 of the UE 1503 and the current transmission power information 1504, so it can acquire transmission power margin information of the UE 1503 through Equation (2). Therefore, as described above, the Node B 1502 can acquire both the transmission power information and the transmission power margin information representing an uplink channel condition of UEs, thereby enabling more efficient and optimized scheduling.

The NBAP message must be transmitted from the RNC 1501 to the Node B 1502 when the RNC 1501 transmits the Maximum Allowed UL Tx Power IE 1505 to the UE 1503, and once it is transmitted, additional message information is not necessary unless a Node B is changed or added.

Ninth Embodiment

The ninth embodiment will now be described below. In this embodiment, a UE sends only transmission power margin information over a physical channel. On the other hand, a Node B receives Maximum Allowed UL Tx Power information of the UE from an RNC via Iub connection through NBAP signaling. For the NBAP message necessary for a newly-defined EUDCH, a new message can be defined or the existing messages can be partially modified. The UEs' Maximum Allowed UL Tx Power information stored in the RNC is included in the NBAP messages necessary for the EUDCH before being transmitted. The UEs are also UEs desiring to use the EUDCH.

Figure 16:
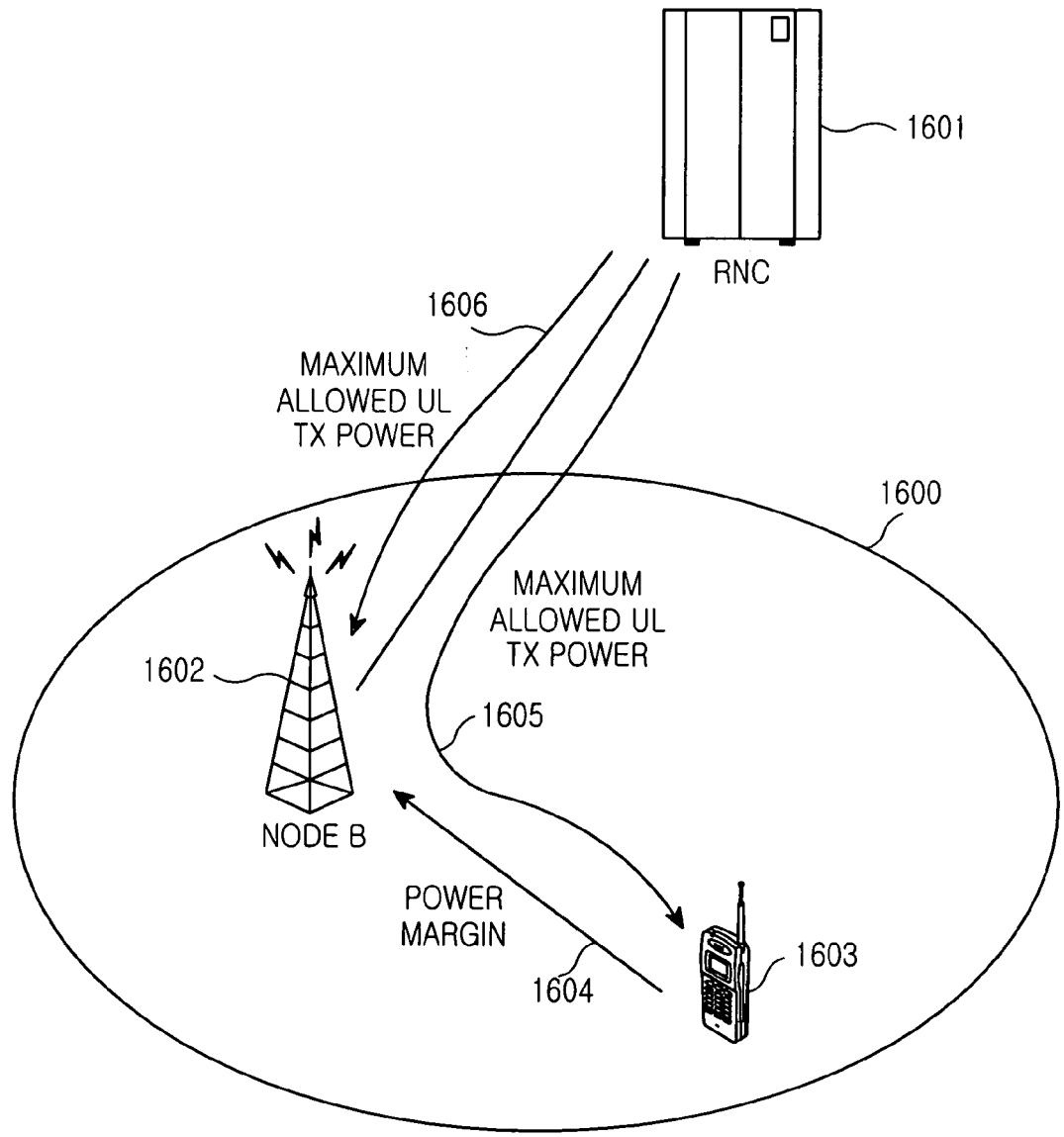
FIG. 16 is a diagram illustrating a system confirmation according to a ninth embodiment of the present invention.

FIG. 16 is a detailed diagram illustrating the method proposed in the ninth embodiment. In FIG. 16, a UE 1603 is receiving an EUDCH service. An RNC 1601 delivers a Maximum Allowed UL Tx Power IE 1605 to the UE 1603, and the UE 1603 then can acquired its available total transmission power information. When the EUDCH service is initiated, the RNC 1601 sends the total Maximum Allowed UL Tx Power information of the UE 1603, stored therein, to the Node B 1602 through an NBAP message 1606. In transmitting the EUDCH, the UE 1603 periodically sends transmission power margin information 1604 of the UE 1603 to the Node B 1602 using a physical channel. Then the Node B 1602 acquires Maximum Allowed UL Tx Power information 1606 of the UE 1603 and the current transmission power margin information 1604, so it can acquire transmission power information representing uplink channel information of the UE 1603 through Equation (2). Therefore, as described above, the Node B 1602 can acquire both the transmission power information and the transmission power margin information representing an uplink channel condition of UEs, thereby enabling more efficient and optimized scheduling.

Tenths and eleventh embodiments of the present invention provide a method for minimizing information delivered from a UE to a Node B over a physical channel, by enabling transmission of UE's Maximum Allowed UL Tx Power information an RNC has acquired through the above process and total transmission power information, from the RNC to the Node B. In these embodiments, a UE uses a smaller power value out of its total transmission power information and the Maximum Allowed UL Tx power information provided from the RNC, during uplink transmission. Therefore, a UE using the EUDCH satisfies a relation, shown in Equation (3) below, between transmission power information and transmission power margin information, which are given as uplink channel information.

$$Tx_{power} + Tx_{margin} = \text{Min}(Tx_{allowed\_power}, TX_{max\_power}) \quad (3)$$

Tenth Embodiment

The tenth embodiment will now be described below. In this embodiment, a UE sends only uplink channel condition information such as uplink transmission power information over a physical channel. On the other hand, a Node B receives Maximum Allowed UL Tx Power information of the UE and total transmission power information from an RNC through Iub signaling. The RNC includes UEs' Maximum Allowed UL Tx Power information determined for the UEs and the total transmission power information in NBAP messages necessary for the EUDCH, before transmission. The UEs are also UEs desiring to use the EUDCH.

Figure 17:
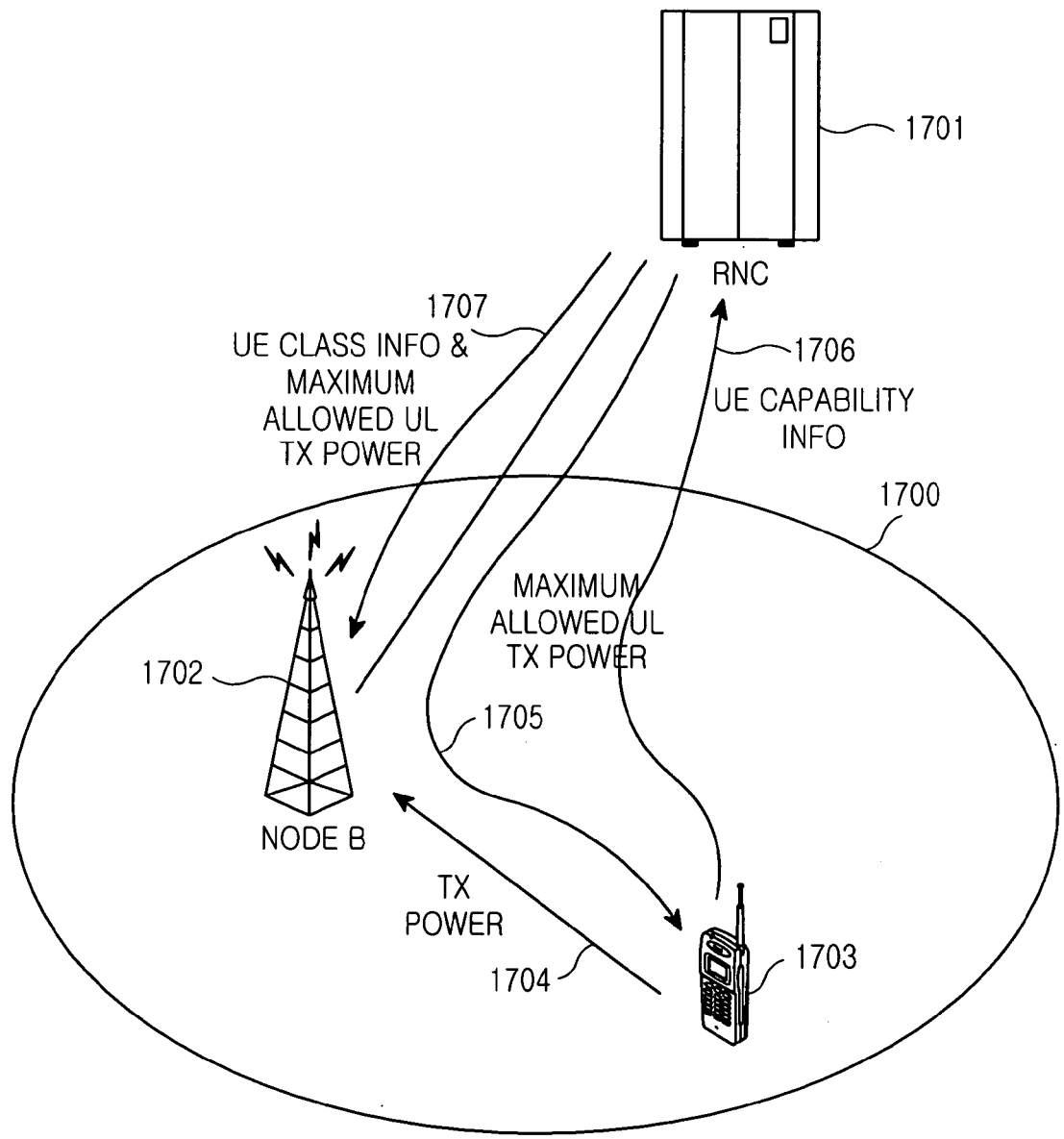
FIG. 17 is a diagram illustrating a system confirmation according to a tenth embodiment of the present invention.

FIG. 17 is a detailed diagram illustrating the method proposed in the tenth embodiment. In FIG. 17, a UE 1703 is receiving an EUDCH service, and an RNC 1701 is controlling the UE 1703. The RNC 1701 can determine UE capability of the UE 1703 through an RRC message 1706 called "UE capability information," and can determine the total transmission power information of the UE 1703 with UE power class information included in the UE capability information. In addition, the RNC 1701 sends a Maximum Allowed UL Tx Power IE 1705 to the UE 1703, and the UE 1703 then can acquire its available total transmission power information. When the EUDCH service is initiated, the RNC 1701 sends the Maximum Allowed UL Tx Power information and the total transmission power information of the UE 1703, stored therein, to a Node B 1702 through an NBAP message 1707. In transmitting the EUDCH, the UE 1703 periodically sends transmission power information 1704 representing uplink channel condition information of the UE 1703 to the Node B 1702 using a physical channel. The Node B 1702 then acquires Maximum Allowed UL Tx Power information of the UE 1703 and the total transmission power information 1707. In addition, the Node B 1702 acquires the current transmission power information 1704, so it can acquire transmission power margin information of the UE 1703 through Equation (3). Therefore, as described above, the Node B 1702 can acquire both the transmission power information and the transmission power margin information representing an uplink channel condition of UEs, thereby enabling more efficient and optimized scheduling.

The NBAP message must be transmitted from the RNC 1701 to the Node B 1702 when the RNC 1701 transmits the Maximum Allowed UL Tx Power IE to the UE 1703, and once it is transmitted, additional message information is not necessary unless a Node B is changed or added.

Eleventh Embodiment

The eleventh embodiment will now be described below. In this embodiment, a UE sends only transmission power margin information over a physical channel. On the other hand, a Node B receives Maximum Allowed UL Tx Power information of the UE and total transmission power information from an RNC through via Iub connection through NBAP signaling. For the NBAP message necessary for a newly-defined EUDCH, a new message can be defined or the existing messages can be partially modified. The UEs' Maximum Allowed UL Tx Power information stored in the RNC is included in the NBAP messages necessary for the EUDCH before being transmitted. The UEs are also UEs desiring to use the EUDCH.

Figure 18:
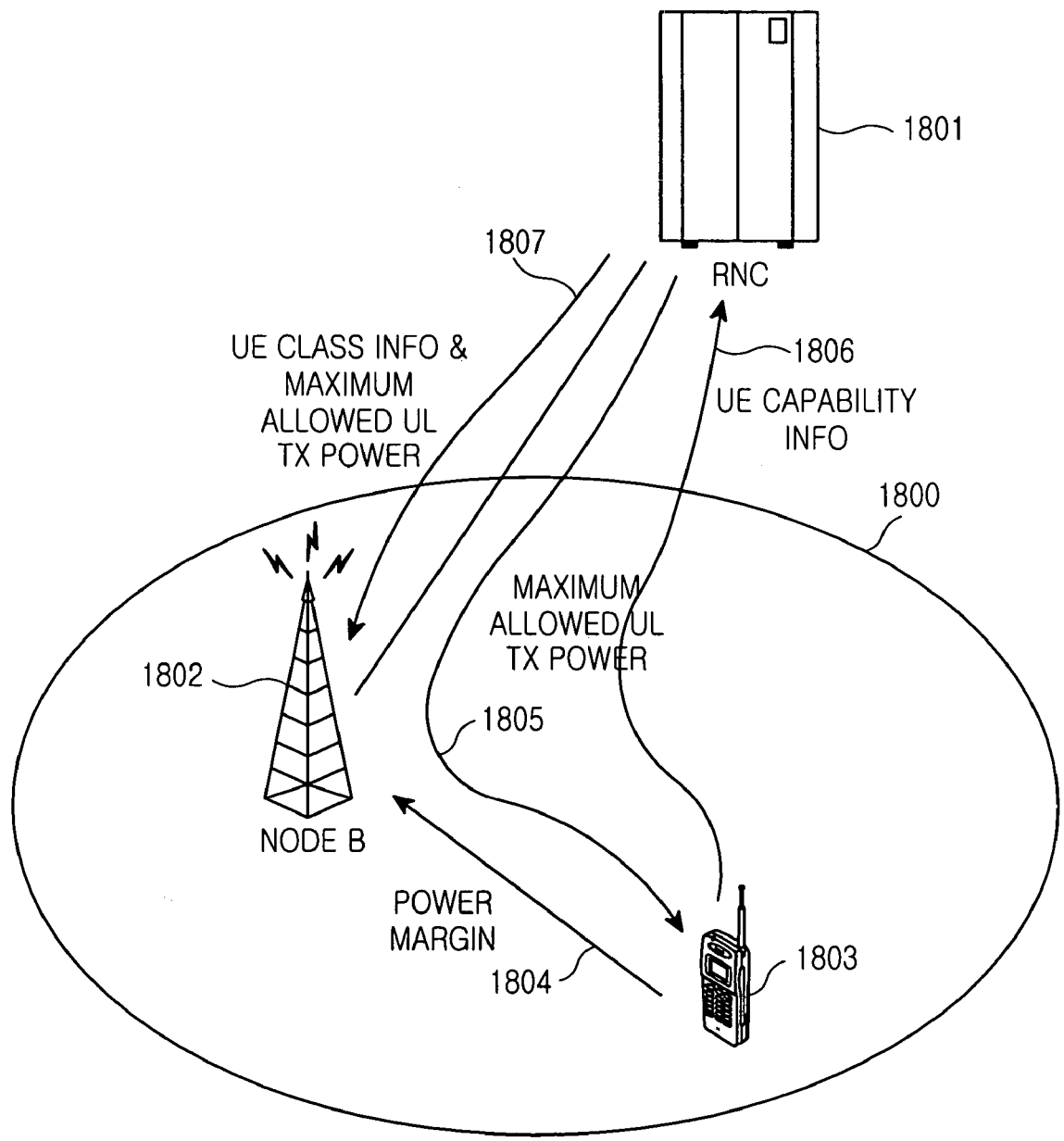
FIG. 18 is a diagram illustrating a system confirmation according to an eleventh embodiment of the present invention.

FIG. 18 is a detailed diagram illustrating the method proposed in the eleventh embodiment. In FIG. 18, a UE 1803 is receiving an EUDCH service, and an RNC 1801 can determine UE capability of the UE 1803 through an RRC message 1806 called "UE capability information," and can determine the total transmission power information of the UE 1803 with UE power class information included in the UE capability information. In addition, the RNC 1801 sends a Maximum Allowed UL Tx Power IE 1805 to the UE 1803, and the UE 1803 then can acquire its available total transmission power information. When the EUDCH service is initiated, the RNC 1801 sends the Maximum Allowed UL Tx Power information and the total transmission power information of the UE 1803, stored therein, to a Node B 1802 through an NBAP message 1807. In transmitting the EUDCH, the UE 1803 periodically sends transmission power margin information 1804 of the UE 1803 to the Node B 1802 using a physical channel. The Node B 1802 then acquires Maximum Allowed UL Tx Power information of the UE 1803 and the total transmission power information 1807. In addition, the Node B 1802 acquires the current transmission power margin information 1804, so it can acquire transmission power information representing uplink channel information of the UE 1803 through Equation (3). Therefore, as described above, the Node B 1802 can acquire both the transmission power information and the transmission power margin information representing an uplink channel condition of UEs, thereby enabling more efficient and optimized scheduling.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method for determining a data rate of a user equipment (UE) for an enhanced uplink dedicated channel (EUDCH) service, the method comprising the steps of:

receiving at a radio network controller (RNC) a radio resource control (RRC) message including total transmission power information of the UE from the UE;

receiving at a Node B the total transmission power information of the UE from the RNC through a Node B Application Part 0VBAP) message;

receiving at the Node B uplink channel condition information of the UE from the UE through a physical channel; and determining at the node B a data rate of the LIE based on the uplink channel condition information and the total transmission power information.

2. The method of claim 1, wherein the uplink channel condition information of the UE is transmission power information of the UE.

3. The method of claim 2, further comprising the step of calculating at the node B transmission power margin information of the UE using the total transmission power and the transmission power information, and determining a data rate of the UF based on the transmission power information and the transmission power margin information.

4. A method for determining a data rate of a user equipment (UE) for an enhanced uplink dedicated channel (EUDCH) service in a mobile communication system, the method comprising the steps of:

receiving at a radio network controller (RNC) a radio resource control (RRC) message including total transmission power information of the UE from the UE;

receiving at a Node B the total transmission power information of the UE from the RNC through a Node B Application Part (NBAP) message;

receiving at the Node B transmission power margin information of the UE from the UE through a physical channel; and determining at the node B a data rate of the UE based on the transmission power margin information and the total transmission power information.

5. The method of claim 1, wherein the RNC transmits the NBAP message including the total transmission power information to the Node B through an Iub interface.

* * * * *